US010503960B2

(12) United States Patent
Hong et al.

(10) Patent No.: US 10,503,960 B2
(45) Date of Patent: Dec. 10, 2019

(54) SEGMENT-BASED HANDWRITTEN SIGNATURE AUTHENTICATION SYSTEM AND METHOD

(71) Applicants: SECUVE CO., LTD., Seoul (KR); Paul Hong, Seoul (KR)

(72) Inventors: Ki-Yoong Hong, Seoul (KR); Paul Hong, Seoul (KR)

(73) Assignees: SECUVE CO., LTD., Seoul (KR); Paul Hong, Seoul (KR)

( * ) Notice: Subject to any disclaimer, the term of this patent is extended or adjusted under 35 U.S.C. 154(b) by 174 days.

(21) Appl. No.: 15/756,717

(22) PCT Filed: Aug. 30, 2016

(86) PCT No.: PCT/KR2016/009669
§ 371 (c)(1),
(2) Date: Mar. 1, 2018

(87) PCT Pub. No.: WO2017/039287
PCT Pub. Date: Mar. 9, 2017

(65) Prior Publication Data
US 2018/0247108 A1 Aug. 30, 2018

(30) Foreign Application Priority Data

Sep. 2, 2015 (KR) .................. 10-2015-0124507

(51) Int. Cl.
*G06K 9/00* (2006.01)
*G06F 3/041* (2006.01)
(Continued)

(52) U.S. Cl.
CPC ......... *G06K 9/00194* (2013.01); *G06F 3/041* (2013.01); *G06F 3/0488* (2013.01);
(Continued)

(58) Field of Classification Search
USPC ........................................................ 382/120
See application file for complete search history.

(56) References Cited

U.S. PATENT DOCUMENTS 4,495,644 A   1/1985  Parks et al.
5,010,213 A * 4/1991  Moriwaki ............... G06F 3/045
                                          178/18.05
(Continued)

FOREIGN PATENT DOCUMENTS

EP    0701226  *  3/1996  ............... G06K 9/34
EP    0858047 A1    8/1998
(Continued)

OTHER PUBLICATIONS

Extended European Search Report of corresponding Patent Application No. 16842253.3—10 pages (dated Jul. 18, 2019).
(Continued)

*Primary Examiner* — Jerome Grant, II
(74) *Attorney, Agent, or Firm* — Studebaker & Brackett PC

(57) ABSTRACT

Provided is a segment-based handwritten signature authentication system and method and, more specifically, to a segment-based handwritten signature authentication system and method, in which handwritten signature authentication based on segments is performed by using handwritten signature characteristics information based on segments disjointed by a user's signing behavior.

19 Claims, 7 Drawing Sheets

(51) Int. Cl.
  *G06F 3/0488* (2013.01)
  *G06F 21/31* (2013.01)
  *G06K 9/62* (2006.01)
  *G06K 9/22* (2006.01)
(52) U.S. Cl.
  CPC .......... *G06F 3/04883* (2013.01); *G06F 21/31* (2013.01); *G06K 9/00154* (2013.01); *G06K 9/00161* (2013.01); *G06K 9/00181* (2013.01); *G06K 9/00416* (2013.01); *G06K 9/222* (2013.01); *G06K 9/6293* (2013.01)

(56) References Cited

U.S. PATENT DOCUMENTS

| | | | | |
|---|---|---|---|---|
| 5,113,452 | A | * | 5/1992 | Chatani ................ G06K 9/222 382/177 |
| 5,745,598 | A | | 4/1998 | Shaw et al. |
| 5,909,500 | A | * | 6/1999 | Moore ................ G07C 9/0015 382/123 |
| 6,069,968 | A | | 5/2000 | Shaw et al. |
| 6,359,241 | B1 | | 3/2002 | Shaw et al. |
| 6,643,401 | B1 | * | 11/2003 | Kashioka ............ G06K 9/6821 382/179 |
| 2012/0099147 | A1 | * | 4/2012 | Tanaka ................ G06F 3/1206 358/1.15 |
| 2015/0071505 | A1 | | 3/2015 | Kim et al. |
| 2016/0321214 | A1 | * | 11/2016 | Hickey ................ G06F 3/0484 |
| 2018/0181212 | A1 | * | 6/2018 | Miyazawa .......... G06F 3/04883 |
| 2019/0087654 | A1 | * | 3/2019 | Xiao ................ G06K 9/00416 |

FOREIGN PATENT DOCUMENTS

| | | |
|---|---|---|
| JP | 2002-8036 A | 1/2002 |
| JP | 2002-077142 A | 3/2002 |
| JP | 2002-222426 A | 8/2002 |
| JP | 2003-271966 A | 9/2003 |
| KR | 1020150011305 | 1/2015 |

OTHER PUBLICATIONS

Office Action of corresponding Japanese Patent Application No. 2018-511663—10 pages (dated May 13, 2019).

Impedovo et al., "Automatic Signature Verification: The State of the Art", IEEE Transactions on Systems, Man, and Cybernetics—Part C: Applications and Reviews, vol. 38, No. 5—86 pages (Sep. 2008).

* cited by examiner

SEGMENT-BASED HANDWRITTEN SIGNATURE AUTHENTICATION SYSTEM AND METHOD

BACKGROUND

The present invention relates to a segment-based handwritten signature authentication system and method and, more specifically, to a segment-based handwritten signature authentication system and method, in which handwritten signature authentication based on segments is performed by using handwritten signature characteristics information based on segments disjointed by a user's signing behavior.

The development of application-based smart devices (e.g. smartphones, smart pads, etc.) and the advancement of mobile and Internet communications technology have made it possible to access various services conveniently and readily through the Internet or applications.

Many such services require user authentication to prevent a third party from using the services by stealing the user's identity.

While in the offline environment, user authentication can be performed with the user's identification card or driver's license on a face-to-face basis, in the online environment, where the service provider does not come into contact with users, different methods of user authentication are needed.

For this reason, a variety of technologies have been developed and applied to verify the user's identity of the personal information entered for use of the services.

The most commonly used technologies for user authentication are the ones using Short Message Service (SMS), Automatic Response System (ARS), and digital signatures (electronic signatures).

User authentication via SMS involves sending an SMS message with an authentication code to the user's mobile device, namely a mobile (cell) phone or smartphone, and requiring the user to enter the code into the mobile website or mobile application on the device. User authentication is completed when the code registered for the device and the code entered into the device match each other.

In using the above technologies, however, there is a risk of identity theft in case of the loss of the device or leakage of personal information.

Therefore, there is a trend toward hybrid methods that employ two or more of the above technologies to enhance user security, which is increasing demand for additional technologies for more accurate user authentication.

Handwritten signature authentication is a case in point, which considers individual characteristics of each user.

Handwritten signature authentication technologies include an image comparison method by examining a match rate of the handwritten signature image, and a behavioral characteristics data comparison method by examining a match rate of the handwritten signature behavioral characteristics.

There are many cases where a handwritten signature authentication system employing the image comparison method allows a third party to steal the user's identity if the third party copies the user's signature image, and the system concludes the two signatures match.

Because of this drawback, the behavioral characteristics comparison method is preferred in a handwritten signature authentication system.

A handwritten signature authentication system employing the behavioral characteristics data comparison method performs handwritten signature authentication by extracting and storing the characteristics of the user's signature patterns, such as pressure, speed, intersection points, and inflection point angles. However, the behavioral characteristics comparison method also often leads to cases where a third party copies the behavioral characteristics to some extent when copying a handwritten signature image. In some cases, the traditional handwritten signature authentication system determines that two signatures match on the basis of similar behavioral characteristics even when the images of the two signatures are completely different.

Accordingly, there is a demand for a method for a handwritten signature authentication system that can distinguish handwritten signatures more accurately, thereby enhancing security with higher levels of handwritten signature recognition and authentication accuracy.

SUMMARY OF THE INVENTION

Accordingly, the present invention relates to a segment-based handwritten signature authentication system and method that enrolls a handwritten signature by storing handwritten signature characteristics information based on segments disjointed by a user when writing a handwritten signature, acquires handwritten signature characteristics information based on segments from the handwritten signature written by the user when handwritten signature authentication is requested, and performs a segment-based handwritten signature authentication by comparing pre-enrolled handwritten signature characteristics information based on segments with the acquired handwritten signature characteristics information based on segments.

The present invention also relates a segment-based handwritten signature authentication system and method, for enhancing security, that reconstructs a handwritten signature image by using handwritten signature behavioral characteristics information when the segment-based handwritten signature authentication is successful, and performs handwritten signature authentication according to a match rate obtained by comparing the reconstructed handwritten signature image with the handwritten signature image acquired when the signature is handwritten.

In order to accomplish the above objects, the present invention provides a segment-based handwritten signature authentication system, the system including: a handwritten signature input unit that includes a touch input unit that outputs touch data, as handwritten signature input data, including position data and pressure data with respect to positions that are touched by a signer for a handwritten signature; an enrollment unit that enrolls handwritten signature characteristics information of each signer; and a handwritten signature authentication unit that identifies and counts handwritten signature segments disjointed by the signer from the handwritten signature input data entered from the handwritten signature input unit, collects handwritten signature characteristics information ($\Sigma$) including characteristics information of the entire handwritten signature and the handwritten signature segments with the counted number of the handwritten signature segments, maps the collected handwritten signature characteristics information to identification information of the signer, enrolls the collected handwritten signature characteristics information in the enrollment unit, collects handwritten signature characteristics information ($\Sigma$) including behavioral characteristics information of the handwritten signature and the handwritten signature segments from the touch data entered through the touch input unit of the handwritten signature input unit upon request for handwritten signature authentication, loads the enrolled handwritten signature characteristics information (Σ') that corresponds with the identification information of the signer who requests the handwritten signature authentication, and performs a segment-based handwritten signature authentication according to a match rate by comparing the enrolled handwritten signature characteristics information (Σ') with the collected handwritten signature characteristics information (Σ).

The handwritten signature authentication unit may include: a handwritten signature characteristics extraction unit that extracts the handwritten signature characteristics information (Σ) including a handwritten signature image, handwritten signature image characteristics information (STAT), handwritten signature segment image characteristics information (F) of the handwritten signature segments that constitutes the handwritten signature, and handwritten signature segment total behavioral characteristics information (ω) from the handwritten signature input data entered through the touch input unit of the handwritten signature input unit; a segment handwritten signature authentication unit that performs handwritten signature authentication according to each predetermined match rate by comparing the handwritten signature image characteristics information (STAT) extracted through the handwritten signature characteristics extraction unit with the enrolled handwritten signature image characteristics information (STAT') corresponding with the pre-enrolled identification information of the signer who requests handwritten signature authentication, comparing the handwritten signature segment image characteristics information (F) with the pre-enrolled handwritten signature segment image characteristics information (F'), and comparing the handwritten signature segment total behavioral characteristics information (ω) with the pre-enrolled handwritten signature segment total behavioral characteristics information (ω'); and a control unit that saves and enrolls the handwritten signature characteristics information, as extracted through the handwritten signature characteristics extraction unit, to the enrollment unit at time of request for enrollment and performs handwritten signature authentication by controlling the segment handwritten signature authentication unit at time of request for handwritten signature authentication.

The handwritten signature characteristics extraction unit may include: a handwritten signature tracking unit that detects and outputs the position data included in the touch data of the handwritten signature input data entered from the handwritten signature input unit; a handwritten signature image acquisition unit that creates a tracked handwritten signature image from the position data entered from the handwritten signature tracking unit, extracts the handwritten signature image characteristics information (STAT) from the tracked handwritten signature image, and outputs the extracted handwritten signature image characteristics information (STAT) together with the tracked handwritten signature image; and a handwritten signature characteristics acquisition unit that outputs total handwritten signature segment image characteristics information (F) and handwritten signature segment total behavioral characteristics information (ω) extracted from the touch data.

The handwritten signature characteristics acquisition unit may include: a segment characteristics detection unit that identifies and counts the segments of the handwritten signature from the touch data, creates handwritten signature segment images of the identified segments, extracts handwritten signature segment total behavioral characteristics information (ω) including the handwritten signature segment image characteristics information (F) of the handwritten signature segment images and handwritten signature segment behavioral characteristics information (Π), and outputs handwritten signature segment characteristics information including the handwritten signature segment image characteristics information (F) and the handwritten signature segment total behavioral characteristics information (ω).

The segment characteristics detection unit may further extract handwritten signature segment movement behavioral information (M) created by movements between the handwritten signature segments and outputs the handwritten signature segment total behavioral characteristics information (ω) that further includes the extracted handwritten signature segment movement behavioral information (M).

The handwritten signature segment image characteristics information (F), ), as figural characteristics information of handwritten signature segment image, includes: position information on a start point ($p_i$) and an end point ($q_i$) of each handwritten signature segment, a width ($w_i$) and a height ($h_i$) of the handwritten signature segment, a center point (center$_i$), a top point (top$_i$), a bottom point (bottom$_i$), a leftmost point (left$_i$) and a rightmost point (right$_i$) of the handwritten signature segment; information on angles (A.top$_i$, A.bottom$_i$, A.left$_i$, A.right$_i$) and distances (D.top$_i$, D.bottom$_i$, D.left$_i$, D.right$_i$) between each point and the center point (center$_i$); and information on a rate (RATE ($w_i$, D.top$_i$)) of distance (D.top$_i$) to the top point against the width ($w_i$), a rate (RATE ($w_i$, D.bottom$_i$)) of distance (D.bottom$_i$) to the bottom point against the width ($w_i$), a rate (RATE ($w_i$, D.left$_i$)) of distance (D.left$_i$) to the leftmost point against the width ($w_i$), a rate (RATE ($w_i$, D.right$_i$)) of distance (D.right$_i$) to the rightmost point against the width ($w_i$), a rate (RATE ($h_i$, D.top$_i$)) of distance (D.top$_i$) to the top point against the height ($h_i$), a rate (RATE ($h_i$, D.bottom$_i$)) of distance (D.bottom$_i$) to the bottom point against the height ($h_i$), a rate (RATE ($h_i$, D.left$_i$)) of distance (D.left$_i$) to the leftmost point against the height ($h_i$), and a rate (RATE ($h_i$, D.right$_i$)) of distance (D.right$_i$) to the rightmost point against the height ($h_i$).

The handwritten signature segment behavioral characteristics information (Π), as information created by the signer's behavioral habits of writing the handwritten signature segments, includes: position information on a start point ($p_i$) and an end point ($q_i$) of each segment; information on a start time ($t_{i,start}$) and an end time ($t_{i,end}$) of each segment; information on a width ($w_i$) and a height ($h_i$) of each handwritten signature segment image; information on a segment elapsed time ($t_i$) spent for each handwritten signature segment; and information on a rate ($Rw_i$) of the width ($w_i$) of each handwritten signature segment image against a width (W) of the handwritten signature image, a rate ($Rh_i$) of the height ($h_i$) of each handwritten signature segment image against a height (H) of the handwritten signature image, and a rate ($Rt_i$) of the segment elapsed time ($t_i$) spent for each handwritten signature segment against total handwritten signature elapsed time (T) spent for the entire handwritten signature.

The handwritten signature segment movement behavioral characteristics information (M) may include: information on an angle ($a_j$) of an imaginary line connected from an end point ($q_{j-1}$) of an arbitrary $1^{st}$ segment to a start point ($p_j$) of an arbitrary $2^{nd}$ segment in the xy coordinate system; information on a segment distance ($d_j$) from an end point ($q_{j-1}$) of an arbitrary $1^{st}$ segment to a start point ($p_j$) of an arbitrary $2^{nd}$ segment in the xy coordinate system; information on a segment movement elapsed time ($\Delta_j$) spent for moving from an end point ($q_{j-1}$) of an arbitrary $1^{st}$ segment to a start point ($p_j$) of an arbitrary $2^{nd}$ segment in the xy coordinate system; and information on a rate ($\delta w_j$) of the segment distance ($d_j$)

against the width (W) of handwritten signature image, a rate ($\delta h_j$) of the segment distance ($d_j$) against the height (H) of handwritten signature image, and a rate ($\delta t_j$) of the segment movement elapsed time ($\Delta_j$) against the total handwritten signature elapsed time (T) spent for entire handwritten signature.

The handwritten signature authentication unit may further include: an image reconstruction unit that regenerates a reconstructed handwritten signature image by using the tracked handwritten signature image, the handwritten signature segment image characteristics information (F), the handwritten signature segment images, and the handwritten signature segment total behavioral characteristics information ($\omega$); and a comparison unit comparing the reconstructed handwritten signature image with the tracked handwritten signature image to determine whether the reconstructed handwritten signature image and the tracked handwritten signature image are matched when each of the enrollment and the authentication is successful and outputting the match result to the the control unit, wherein the control unit saves and enrolls the handwritten signature characteristics information ($\Sigma$) to the enrollment unit or decides that the result of the handwritten signature authentication is finally successful if the match result entered from the comparison unit is successful.

The handwritten signature authentication unit may further include a normalization unit adding the reconstructed handwritten signature image to reconstructed handwritten signature images previously stored in the enrollment unit when each of the enrollment and the authentication is successful, normalizing the reconstructed handwritten signature image, and storing the normalized handwritten signature image, wherein the comparison unit compares the input reconstructed handwritten signature image with the normalized handwritten signature image and performs handwritten signature authentication according to whether the input reconstructed handwritten signature image and the normalized handwritten signature image are matched.

The handwritten signature authentication unit may further include a normalization unit adding the collected handwritten signature characteristics information ($\Sigma$) to handwritten signature characteristics information ($\Sigma'$) previously stored in the enrollment unit when each of the enrollment and the authentication is successful, normalizing the handwritten signature characteristics information, and storing the normalized handwritten signature characteristics information ($\Sigma''$) in the enrollment unit, wherein the comparison unit performs handwritten signature characteristics authentication according to whether a match result is successful by comparing the input handwritten signature characteristics information ($\Sigma$) with the normalized handwritten signature characteristics information ($\Sigma''$), compares the reconstructed handwritten signature image with the normalized handwritten signature image if the result of handwritten signature characteristics authentication is successful, and outputs a match result according to whether the reconstructed handwritten signature image and the normalized handwritten signature image are matched, and the control unit performs handwritten signature authentication according to whether the input handwritten signature characteristics information ($\Sigma$) and the normalized handwritten signature characteristics information ($\Sigma''$) are matched and whether the reconstructed handwritten signature image and the normalized handwritten signature image are matched and, if both of the above authentications are successful, concludes that user authentication is finally successful.

In order to accomplish the above objects, the present invention provides a segment-based handwritten signature authentication method, the method including: an enrollment process in which a handwritten signature authentication unit identifies and counts segments disjointed by a signer from handwritten signature input data entered through a handwritten signature input unit, collects handwritten signature characteristics information ($\Sigma$) including characteristics information of entire handwritten signature and handwritten signature segments with the counted number of the segments, maps the handwritten signature characteristics information to identification information of the signer, and enrolls the handwritten signature characteristics information in the enrollment unit; and a handwritten signature authentication process in which the handwritten signature authentication unit collects handwritten signature characteristics information ($\Sigma$) including characteristics information of entire handwritten signature and handwritten signature segments from touch data entered through a touch input unit of the handwritten signature input unit upon request for handwritten signature authentication, and performs handwritten signature authentication according to a match rate by loading the enrolled handwritten signature characteristics information ($\Sigma'$) that corresponds with the identification information of the signer who requests handwritten signature authentication and comparing the enrolled handwritten signature characteristics information ($\Sigma'$) with the collected handwritten signature characteristics information ($\Sigma$).

The enrollment process may include: an enrollment request monitoring step that monitors whether a handwritten signature enrollment request is made; a signer identification information acquisition step that acquires the signer identification information to be enrolled upon request for handwritten signature enrollment; a handwritten signature characteristics information acquisition step that acquires the handwritten signature characteristics information ($\Sigma$) from the touch data entered through the touch input unit of the handwritten signature input unit; and a handwritten signature enrollment step that maps the handwritten signature characteristics information to the identification information of the signer and enrolls the handwritten signature characteristics information in the enrollment unit.

The handwritten signature authentication process may include: a handwritten signature authentication request monitoring step that monitors whether a handwritten signature authentication request is made; a signer identification information acquisition step that acquires the signer identification information when the handwritten signature authentication request is made; a handwritten signature characteristics information acquisition step that acquires the handwritten signature characteristics information ($\Sigma$) from the touch data entered through the touch input unit regarding to the handwritten signature of the signer; an enrolled handwritten signature characteristics information loading step that loads the pre-enrolled handwritten signature characteristics information ($\Sigma'$) corresponding with the acquired signer identification information; and a handwritten signature authentication step that performs handwritten signature authentication by comparing the acquired handwritten signature characteristics information ($\Sigma$) with the loaded handwritten signature characteristics information ($\Sigma'$) and outputs a result of the authentication.

The handwritten signature characteristics information ($\Sigma$) acquisition step may include: a handwritten signature tracking step that begins tracking the handwritten signature from the touch data of the handwritten signature input data entered from the handwritten signature input unit; a handwritten signature segment characteristics information extraction step that identifies and counts the handwritten signature segments disjointed by the signer from the touch data when the handwritten signature tracking begins, creates each handwritten signature segment image, acquires the handwritten signature segment total behavioral characteristics information ($\omega$) that is the behavioral characteristics information of each handwritten signature segment, and also acquires handwritten signature segment image characteristics information (F) from each handwritten signature segment image when each handwritten signature segment image is created; and a handwritten signature characteristics information extraction step that acquires the handwritten signature image when the signer finishes handwriting the signature, acquires handwritten signature behavioral characteristics information ($\Phi$) corresponding with the acquired handwritten signature image, and acquires handwritten signature image characteristics information (STAT) for the acquired handwritten signature image.

The handwritten signature segment characteristics information extraction step may further include extracting handwritten signature segment movement behavioral characteristics information (M) that is generated by movements between the disjointed handwritten signature segments and adding the extracted handwritten signature segment movement behavioral information (M) to the handwritten signature segment total behavioral characteristics information ($\omega$).

The handwritten signature segment image characteristics information (F) as figural characteristics information of handwritten signature segment image, includes: position information on a start point ($p_i$) and an end point ($q_i$) of each handwritten signature segment, a width ($w_i$) and a height ($h_i$) of the handwritten signature segment, a center point (center$_i$), a top point (top$_i$), a bottom point (bottom$_i$), a leftmost point (left$_i$) and a rightmost point (right$_i$) of the handwritten signature segment; information on angles (A.top$_i$, A.bottom$_i$, A.left$_i$, A.right$_i$) and distances (D.top$_i$, D.bottom$_i$, D.left$_i$, D.right$_i$) between each point and the center point (center$_i$); and information on a rate (RATE ($w_i$, D.top$_i$)) of distance (D.top$_i$) to the top point against the width ($w_i$), a rate (RATE ($w_i$, D.bottom$_i$)) of distance (D.bottom$_i$) to the bottom point against the width ($w_i$), a rate (RATE ($w_i$, D.left$_i$)) of distance (D.left$_i$) to the leftmost point against the width ($w_i$), a rate (RATE ($w_i$, D.right$_i$)) of distance (D.right$_i$) to the rightmost point against the width ($w_i$), a rate (RATE ($h_i$, D.top$_i$)) of distance (D.top$_i$) to the top point against the height ($h_i$), a rate (RATE ($h_i$, D.bottom$_i$)) of distance (D.bottom$_i$) to the bottom point against the height ($h_i$), a rate (RATE ($h_i$, D.left$_i$)) of distance (D.left$_i$) to the leftmost point against the height ($h_i$), and a rate (RATE ($h_i$, D.right$_i$)) of distance (D.right$_i$) to the rightmost point against the height ($h_i$).

The handwritten signature characteristics information ($\Sigma$) acquisition step may further include: a handwritten signature segment behavioral characteristics information ($\Pi$) acquisition step including, as characteristics information created by signer's behavioral habits of writing the handwritten signature segments, position information on a start point ($p_i$) and an end point ($q_i$) of each handwritten signature segment; information on a start time ($t_{i,start}$) and an end time ($t_{i,end}$) of each handwritten signature segment; information on a width ($w_i$) and a height ($h_i$) of each handwritten signature segment image; information on a segment elapsed time ($t_i$) spent for each handwritten signature segment; information on a rate ($Rw_i$) of the width ($w_i$) of each handwritten signature segment image against the width (W) of the handwritten signature image, a rate ($Rh_i$) of the height ($h_i$) of each handwritten signature segment image against the height (H) of the handwritten signature image, and a rate ($Rt_i$) of the segment elapsed time ($t_i$) spent for each handwritten signature segment against the total handwritten signature elapsed time (T) spent for the entire handwritten signature.

The handwritten signature segment movement behavioral characteristics information (M) may includes: information on an angle ($a_j$) of an imaginary line connected from an end point ($q_{j-1}$) of an arbitrary $1^{st}$ segment to a start point ($p_j$) of an arbitrary $2^{nd}$ segment in the xy coordinate system; information on a segment distance ($d_j$) from an end point ($q_{j-1}$) of an arbitrary $1^{st}$ segment to a start point ($p_j$) of an arbitrary $2^{nd}$ segment in the xy coordinate system; information on a segment movement elapsed time ($\Delta_j$) spent for moving from an end point ($q_{j-1}$) of an arbitrary $1^{st}$ segment to a start point ($p_j$) of an arbitrary $2^{nd}$ segment in the xy coordinate system; and information on a rate ($\delta w_j$) of the segment distance ($d_j$) against the width (W) of the handwritten signature image, a rate ($\delta h_j$) of the segment distance ($d_j$) against the height (H) of the handwritten signature image, and a rate ($\delta t_j$) of the segment movement elapsed time ($\Delta_j$) against the total handwritten signature elapsed time (T) spent for the entire handwritten signature.

The present invention enables more accurate handwritten signature authentication as it performs authentication by identifying handwritten signature segments disjointed by the signer when the handwritten signature is written and collecting the following information: the number of the segments; handwritten signature behavioral characteristics information ($\Pi$) at the segment-level; segment movement behavioral characteristics information (M); and handwritten signature image characteristics information (STAT) for the entire handwritten signature image.

In addition, the present invention enhances the security of handwritten signature by performing an additional authentication that if the segment-based handwritten signature authentication is successful. The additional authentication includes creating a reconstructed handwritten signature image by using behavioral characteristics data for the segments and the entire handwritten signature image and performing authentication according to a match rate by comparing the reconstructed handwritten signature with the tracked handwritten signature image acquired when the handwritten signature is written.

DETAILED DESCRIPTION OF THE INVENTION

Hereinafter, the configuration and operation of a segment-based handwritten signature authentication system according to the present invention will be described with reference to the accompanying drawings, and a segment-based handwritten signature authentication method in the system will be described.

According to the present invention, a handwritten signature segment means a piece of handwritten signature disjointed by a signer during signing. Therefore, the number of segments (n) will vary depending on each user even if the signature is composed of the same content. The specific concept of handwritten signature segment will be described with reference to FIGS. 4 and 5. In the detailed description, the English uppercase letter generally means the data (or information) of the entire handwritten signature, while English lowercase letter means the data (or information) of handwritten signature segments.

Figure 1:
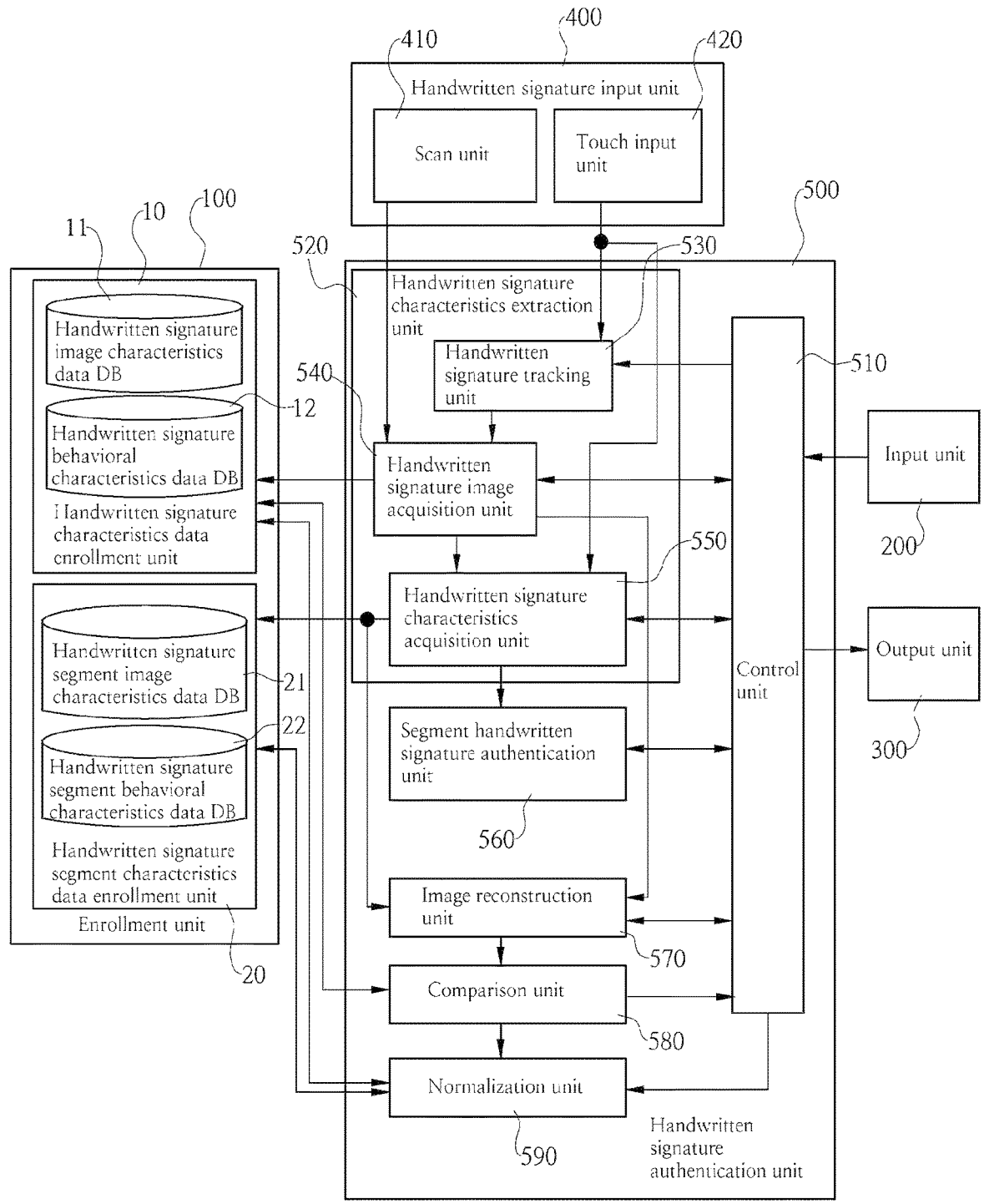
FIG. 1 is a diagram illustrating a configuration of a segment-based handwritten signature authentication system according to the exemplary embodiment of the present invention.

FIG. 1 is a diagram illustrating a configuration of a segment-based handwritten signature authentication system according to the exemplary embodiment of the present invention.

Referring to FIG. 1, a segment-based handwritten signature authentication system according to the present invention includes an enrollment unit 100, a handwritten signature input unit 400 and a handwritten signature authentication unit 500, and and further includes an input unit 200 and an output unit 300 according to the exemplary embodiment of the present disclosure.

The enrollment unit 100 may be configured in a variety of storage media, including hard drives of personal computers (PCs), laptops, etc.; portable hard drives such as universal serial bus (USB) devices, security tokens, subscriber identification module (SIM) cards embedded in mobile devices, such as cell phone or smartphones, micro SD cards in mobile devices; TrustZone in mobile devices; and the hard drives of online servers, and include a handwritten signature characteristics data enrollment unit 10 that stores handwritten signature characteristics information of a handwritten signature and a handwritten signature segment characteristics data enrollment unit 20 that stores handwritten signature segment characteristics information of handwritten signature segments comprising the handwritten signature.

The handwritten signature characteristics data enrollment unit 10 includes a handwritten signature image characteristics data DB 11 and a handwritten signature behavioral characteristics data DB 12.

The handwritten signature image characteristics data DB 11 stores figural and static information (referred to as a "handwritten signature image characteristics information (STAT)" hereinafter) of a handwritten signature image, which is the entire image of the handwritten signature.

Specifically, the handwritten signature image characteristics data DB 11 stores the handwritten signature image characteristics information (STAT) including a start point (P) of the handwritten signature, an end point (Q) of the handwritten signature, a center point (CENTER) of the handwritten signature image (Signature: referred to as "S" hereinafter), a top point (TOP) of the handwritten signature image (S), a bottom point (BOTTOM) of the handwritten signature image (S), a leftmost point (LEFT) of the handwritten signature image (S), a rightmost point (RIGHT) of the handwritten signature image (S), a width (W) of the handwritten signature image (S), a height (H) of the handwritten signature image (S), and relative position information between points (referred to as "DOT" hereinafter)

The relative position information between points (DOT), by setting the center point (CENTER) that is the origin point in the xy coordinate system, includes relative position information of each point (TOP, RIGHT, LEFT, BOTTOM) such as an angle (A.TOP) between the TOP of the handwritten signature image and the center point (CENTER), an angle (A.BOTTOM) between the BOTTOM and the CENTER, an angle (A.LEFT) between the leftmost point (LEFT) and the CENTER, an angle (A.RIGHT) between the rightmost point (RIGHT) and the CENTER, a distance (D.TOP) from the CENTER to the TOP, a distance (D.BOTTOM) from the CENTER to the BOTTOM, a distance (D.LEFT) from the CENTER to the LEFT, a distance (D.RIGHT) from the CENTER to the RIGHT, a rate (RATE (W, D.TOP)) of the distance (D.TOP) to the TOP against the width (W), a rate (RATE (W, D.BOTTOM)) of distance (D.BOTTOM) to the BOTTOM against the width (W), a rate (RATE (W, D.LEFT)) of distance (D.LEFT) to the LEFT against the width (W), a rate (RATE (W, D.RIGHT)) of distance (D.RIGHT) to the RIGHT against the width (W), a rate (RATE (H, D.TOP)) of distance (D.TOP) to the TOP against the height (H), a rate (RATE (H, D.BOTTOM)) of distance (D.BOTTOM) to the BOTTOM against the height (H), a rate (RATE (H, D.LEFT)) of distance (D.LEFT) to the LEFT against the height (H), and a rate (RATE (H, D.RIGHT)) of distance (D.RIGHT) to the RIGHT against the height (H).

The relative position information between points (DOT) may be expressed as shown in Equation 1 below.

DOT={(A.TOP, D.TOP, RATE(W,D.TOP), RATE(H, D.TOP)), (A.BOTTOM, D.BOTTOM, RATE (W,D.BOTTOM), RATE(H,D.BOTTOM)), (A.LEFT, D.LEFT, RATE(W,D.LEFT), RATE (H,D.LEFT)), (A.RIGHT, D.RIGHT, RATE(W, D.RIGHT), RATE(H,D.RIGHT))}   Equation 1

And the handwritten signature image characteristics information (STAT) may be expressed as shown in Equation 2 below.

STAT={TOP, BOTTOM, LEFT, RIGHT, CENTER, W, H, DOT}   Equation 2

The handwritten signature behavioral characteristics data DB 12 includes a start time of a handwritten signature ($T_{start}$), an end time of a handwritten signature ($T_{end}$), a total handwritten signature elapsed time ($T=T_{end}-T_{start}$) spent for entire handwritten signature, etc. Furthermore, the handwritten signature behavioral characteristics data DB 12 may also include handwritten signature behavioral characteristics data extracted at time of handwritten signature authentication by comparison of behavioral characteristics such as speed or pressure of a handwritten signature.

The handwritten signature segment characteristics data enrollment unit 20 includes a handwritten signature segment image characteristics data DB 21 and a handwritten signature segment behavioral characteristics data DB 22.

The handwritten signature segment image characteristics data DB 21 stores handwritten signature segment image characteristics information ($f_i$) of each handwritten signature segment.

The handwritten signature segment image characteristics information ($f_i$), as figural and static information of each handwritten signature segment image, may include such information as a width ($w_i$) and height ($h_i$) of each segment; position information on a center point ($center_i$), a top point ($top_i$), and a bottom point ($bottom_i$) of each segment; information on angles (A.$top_i$, A.$bottom_i$, A.$left_i$, A.$right_i$) and distances (D.$top_i$, D.$bottom_i$, D.$left_i$, D.$right_i$) between points from a leftmost point ($left_i$), rightmost point ($right_i$) and a center point ($center_i$); and information on a rate (RATE ($w_i$, D.$top_i$)) of distance (D.$top_i$) to the top point against the width ($w_i$), a rate (RATE ($w_i$, D.$bottom_i$) of distance (D.$bottom_i$) to the bottom point against the width ($w_i$), a rate (RATE ($w_i$, D.$left_i$) of distance (D.$left_i$) to the leftmost point against the width ($w_i$), a rate (RATE ($w_i$, D.$right_i$) of distance (D.$right_i$) to the rightmost point against the width ($w_i$), a rate (RATE ($h_i$, D.$top_i$)) of the distance (D.$top_i$) to the top point against the height ($h_i$), a rate (RATE ($h_i$, D.$bottom_i$) of the distance (D.$left_i$) to the bottom point against the height ($h_i$), a rate (RATE ($h_i$,D.$left_i$) of the distance (D.$left_i$) to the leftmost point against the height ($h_i$), a rate (RATE ($h_i$, D.$right_i$)) of the distance (D.$right_i$) to the rightmost point against the height ($h_i$), etc.

As the relative position information between points ($dot_i$), the position information of each handwritten signature segment and the information on the angle, distance, and rate from the center point ($center_i$) may be expressed as shown in Equation 3 below.

$$dot_i = \{(A.top_i, D.top_i, RATE(w_i, D.top_i), RATE(h_i, D.top_i)), (A.bottom_i, D.bottom_i, RATE(w_i, D.bottom_i), RATE(h_i, D.bottom_i)), (A.left_i, D.left_i, RATE(w_i, D.left_i), RATE(h_i, D.left_i)), (A.right_i, D.right_i, RATE(w_i, D.right_i), RATE(h_i, D.right_i))\} \quad \text{Equation 3}$$

In other words, the handwritten signature segment image characteristics information ($f_i$) may be expressed as shown in Equation 4 below.

$$f_i = \{top_i, bottom_i, left_i, right_i, center_i, w_i, h_i, dot_i\} \quad \text{Equation 4}$$

The total handwritten signature segment image characteristics information (F) may be expressed as shown in Equation 5 below.

$$F = \{f_0, f_1, f_2, \ldots, f_{n-1}\} \quad \text{Equation 5}$$

The handwritten signature segment behavioral characteristics data DB 22 stores the total handwritten signature segment behavioral characteristics information ($\Pi$). The total handwritten signature segment behavioral characteristics information ($\Pi$) may be expressed as shown in Equation 6 below.

$$\Pi = \{\pi_0, \pi_1, \pi_2, \ldots, \pi_{n-1}\} \quad \text{Equation 6}$$

Handwritten signature segment behavioral characteristics information ($\Pi_i$) for each handwritten signature segment is information created by a signer's behavioral habits of writing handwritten signature segments, and it includes position information on a start point ($p_i$) an end point ($q_i$) of each segment; information on a start time ($t_{i,start}$) and an end time ($t_{i,end}$) of each segment; information on a width ($w_i$) and height ($h_i$) of each handwritten signature segment image; information on a segment elapsed time ($t_i$) spent for each handwritten signature segment; and information on a rate ($Rw_i$) of the width ($w_i$) of each handwritten signature segment image against the width (W) of the handwritten signature image, a rate ($Rh_i$) of the height ($h_i$) of the handwritten signature segment image against the height (H) of the handwritten signature image, and a rate ($Rt_i$) of the segment elapsed time ($t_i$) spent for the handwritten signature segment against a total handwritten signature elapsed time (T) spent for the entire handwritten signature.

Therefore, the handwritten signature segment behavioral characteristics information ($\Pi_i$) on each segment may be expressed as shown in Equation 7 below.

$$\pi_i = \{p_i, q_i, w_i, h_i, t_{i,start}, t_{i,end}, t_i, Rw_i, Rh_i, Rt_i\} \quad \text{Equation 7}$$

The handwritten signature segment movement behavioral characteristics information ($m_j$: j=1, ..., n−1. Only integers) may include an angle ($a_j$) of an imaginary line connected from an end point ($q_{j-1}$) of an arbitrary $1^{st}$ segment to a start point ($p_j$) of an arbitrary $2^{nd}$ segment in the xy coordinate system, a segment distance ($d_j$) from the end point ($q_{j-1}$) of the arbitrary $1^{st}$ segment to the start point ($p_j$) of the arbitrary $2^{nd}$ segment in the xy coordinate system, a segment movement elapsed time ($\Delta_j$) spent for moving from the end point ($q_{j-1}$) of the arbitrary $1^{st}$ segment to the start point ($p_j$) of the arbitrary $2^{nd}$ segment in the xy coordinate system, a rate ($\delta w_j$) of distance ($d_j$) between segments against the width (W) of the handwritten signature image, a rate ($\delta h_j$) of distance ($d_j$) between the segments against the height (H) of the handwritten signature image, and a rate ($\delta t_j$) of the segment movement elapsed time ($\Delta_j$) against the total handwritten signature elapsed time (T) spent for the entire handwritten signature, and it may be expressed as shown in Equation 8 below.

$$m_j\{a_j, d_j, \Delta_j, \delta w_j, \delta h_j, \delta t_j\} \quad \text{Equation 8}$$

The handwritten signature segment total movement behavioral characteristics information (M) for the entire handwritten signature may be expressed as shown in Equation 9 below.

$$M = \{m_1, m_2, m_3, \ldots, m_{n-1}\} \quad \text{Equation 9}$$

The input unit 200 may be a key input device that has numerous keys generating multiple commands and outputs key data (key signals) on pressed keys, a touchpad that also functions as a screen and outputs positional data on touch points, and a receiver that receives data from an external device through wire and wireless communications. The input unit 200 sends commands, such as handwritten signature enrollment commands and handwritten signature authentication commands upon request of a user to the handwritten signature authentication unit 500. If the handwritten signature authentication unit is configured in the form of a server, the input unit 200 may also be a point-of-sale (POS) terminal, payment terminal, or mobile communication terminal from a remote place.

If the handwritten signature authentication unit 500 is configured in a mobile communication terminal, the output unit 300, which outputs a handwritten signature image, handwritten signature characteristics information, and handwritten signature authentication result acquired from the handwritten authentication unit 500, If the handwritten signature authentication unit 500 is set up on a server, the server may be a message sending server that sends handwritten signature authentication results via mobile messages, such as Short Message Service (SMS), Long Message Service (LMS), and Multimedia Message Service (MMS) messages, an application server that sends push notifications, an email server, or a mobile communication terminal that displays the received authentication results.

The handwritten signature input unit 400 is configured in a terminal unit that receives a handwritten signature, such as a PC, mobile communication terminal, POS terminal, or payment terminal owned by the user or service provider or is connected to a separate device that outputs handwritten signature input data to acquire an image of the handwritten signature written by the user and may include at least one of a scan unit 410 and a touch input unit 420. It is recommended, however, to ensure that it includes a touch input unit 420 as it should receive input of a signature in a handwritten form. The touch input unit 420 may be a touchpad, touchscreen, or smart pen, which enables handwritten signature tracking and handwritten signature and segment image characteristics and behavioral characteristics information collection.

The scan unit 410 scans the paper on which a signature is handwritten and outputs the scanned data to the handwritten signature authentication unit 500.

The touch input unit 420 may be a touchpad, touchscreen, etc., and outputs touch data that includes continuous positional data and pressure data on a signature handwritten by a user to the handwritten signature authentication unit 500 as handwritten signature input data.

The handwritten signature authentication unit 500 includes a control unit 510, a handwritten signature characteristics extraction unit 520, and a segment handwritten signature authentication unit 560, and may also include an image reconstruction unit 570, a comparison unit 580, and a normalization unit 590 according to the exemplary embodiment of the present disclosure.

The handwritten signature authentication unit 500 may be set up based on an application in a mobile communication terminal or a computer, based on an application or a web server in a server, or in the form of firmware in a POS or payment terminal. The configuration of an application server, web server, and firmware based on an application, firmware, or web server according to the present invention will not be further described in detail as it is obvious to those skilled in the art.

To describe the configuration and operation of the handwritten signature authentication unit 500 in more detail, the control unit 510 controls the general operation of the handwritten signature authentication unit 500. Especially, the control unit 510 determines whether a command received from the input unit 200 is for handwritten signature enrollment or authentication, controls the operation of enrollment or authentication depending on the command, and sends the control results to the output unit 300.

The handwritten signature characteristics extraction unit 520 extracts segment based handwritten signature characteristics information ($\Sigma$) from the handwritten signature input data entered through the touch input unit 420 of the handwritten signature input unit 400.

Specifically, the handwritten signature characteristics extraction unit 520 includes a handwritten signature tracking unit 530, a handwritten signature image acquisition unit 540, and a handwritten signature characteristics acquisition unit 550.

The handwritten signature tracking unit 530 detects continuous position data from the touch data entered through the touch input unit 420 of the handwritten signature input unit 400 and sends it to the handwritten signature image acquisition unit 540.

The handwritten signature image acquisition unit 540 receives the scan data from the handwritten signature input unit 400 or the position data from the handwritten signature tracking unit 530, acquire the handwritten signature image (referred to as "tracked handwritten signature image" hereinafter) from the scan data and position data, and extracts and outputs the handwritten signature image characteristics information (STAT) from the tracked handwritten signature image (S).

The handwritten signature image acquisition unit 540 may acquire the tracked handwritten signature image (S) through the scan unit 410 or generate one by tracking the touch data entered in real time through the touch input unit 420. The acquired handwritten signature image characteristics information (STAT) is stored in the handwritten signature image characteristics data DB 11 of the enrollment unit 100, and the tracked handwritten signature image will be input to the image reconstruction unit 570.

The handwritten signature characteristics acquisition unit 550 receives the touch data from the touch input unit 420 of the handwritten signature input unit 400 and identifies handwritten signature segment disjointed by a signer based on the position data and pressure data of the touch data when the signature is handwritten. And then the handwritten signature characteristics acquisition unit 550 counts the number (n) of the identified handwritten signature segments, generates handwritten signature segment images corresponding with the identified handwritten signature segments, extracts and outputs handwritten signature segment image characteristics information ($f_i$) corresponding with the generated handwritten signature segment images, and extracts and outputs handwritten signature segment total behavioral characteristics information ($\omega$) on the handwritten signature segments. The handwritten signature segment total behavioral characteristics information ($\omega$) may be expressed as shown in Equation 10 below.

$$\omega=\{n, S, \Pi, M\}, \qquad \text{Equation 10}$$

Here, $S=\{s_0, s_1, s_2, \ldots, s_{n-1}\}$ ($s_i$ means the ith handwritten signature segment image.)

The handwritten signature behavioral characteristics information ($\Phi$) may be direction, angle, movement speed, pressure, acceleration, and distribution characteristics (position, direction, angle, movement speed, pressure, acceleration, etc.) at the tip of a pen (or maybe a finger, electronic pen, touch pen, smart pen, etc.) used when handwriting a signature, and may also include a start time of handwritten signature ($T_{start}$), an end time of handwritten signature ($T_{end}$), a total handwritten signature elapsed time (T) spent for entire handwritten signature, the number of handwritten signature segments (n), a handwritten signature image (S), a start point of handwritten signature (P), an end point of handwritten signature (Q), a width (W) of handwritten signature image, and a height (H) of the handwritten signature image. The handwritten signature behavioral characteristics information ($\Phi$) may be expressed as shown in Equation 11 below.

As described above, the number of handwritten signature segment (n) may be included in the handwritten signature behavioral characteristics information ($\Phi$) or in the handwritten signature segment total behavioral characteristics information ($\omega$).

$$\Phi=\{P, Q, T_{start}, T_{end}, T\} \qquad \text{Equation 11}$$

And the total segment-based handwritten signature characteristics information ($\Sigma$) may be expressed as shown Equation 12 below.

$$\Sigma=\{\Phi, \text{STAT}, F, \omega\} \qquad \text{Equation 12}$$

The detailed configuration of the handwritten signature characteristics acquisition unit 550 will be described in detail referring to FIGS. 2 and 3.

The segment handwritten signature authentication unit 560, following a command for handwritten signature authentication from the control unit 510, receives identification information of a signer from the handwritten signature input unit 400, loads an enrolled handwritten signature characteristics information ($\Sigma'$) corresponding with the signer identification information from the enrollment unit 100 after receiving handwritten signature characteristics information ($\Sigma$) from the handwritten signature characteristics extraction unit 520, and performs handwritten signature authentication by comparing the loaded enrolled handwritten signature characteristics information ($\Sigma'$) with the handwritten signature characteristics information ($\Sigma$) entered from the handwritten signature characteristics extraction unit 520 and determining whether the match rate reaches a certain level of match rate.

Specifically, the segment handwritten signature authentication unit 560 performs handwritten signature authentication by conducting comparison between the handwritten signature image characteristics information (STAT') of the loaded handwritten signature characteristics information ($\Sigma'$) and the handwritten signature image characteristics information (STAT) of the handwritten signature characteristics information ($\Sigma$) extracted through the handwritten signature characteristics extraction unit 520, between the loaded handwritten signature segment image characteristics information (F') and the extracted handwritten signature segment image characteristics information (F), and between the loaded handwritten signature segment behavioral characteristics information ($\Pi'$) and the extracted handwritten signature segment behavioral characteristics information ($\Pi$) and determining whether the match rates of the above comparisons reaches a certain level of match rate.

Specifically, when performing authentication by handwritten signature characteristics information, the segment handwritten signature authentication unit 560 examines whether the number (n) of handwritten signature segments is the same as the number (n') of the enrolled handwritten signature segments, compares the figural and static characteristics of the handwritten signature by the handwritten signature image characteristics information (STAT) of the entire handwritten signature and the handwritten signature segment image characteristics information (F) of each segment as described earlier, and compares the characteristics of the signer's behavioral habits of writing the handwritten signature with the handwritten signature segment total behavioral characteristics information ($\omega$) including handwritten signature segment behavioral characteristics information ($\Pi$) and the handwritten signature segment movement behavioral characteristics (M).

The image reconstruction unit 570 receives the handwritten signature segment image characteristics information (F) and the handwritten signature segment total behavioral characteristics information ($\omega$) from the handwritten signature characteristics acquisition unit 550, reconstructs a handwritten signature image from the handwritten signature segment image characteristics information (F) and the handwritten signature segment total behavioral characteristics information ($\omega$), and outputs the reconstructed handwritten signature image to the comparison unit 580.

At time of enrollment, the comparison unit 580 compares the reconstructed handwritten signature image in the image reconstruction unut 570 with the tracked handwritten signature image stored in the handwritten signature image characteristics data DB 11 of the enrollment unit 100 or the tracked handwritten signature image output from the handwritten signature image acquisition unit 540 to determine whether the authentication is successful according to the match rate and offers the authentication result to the control unit 510.

Whenever the authentication succeeds (i.e., whenever a reconstructed handwritten signature image that corresponds with a handwritten signature created newly by the signer at time of successful authentication is stored in the enrollment unit), the nomarlization unit 590 normalizes the newly stored reconstructed handwritten signature image and the reconstructed handwritten signature images regenerated before a certain period of time and stores the normalized handwritten signature image. The comparison unit 580 may perform authentication by comparing the normalized handwritten signature image with the reconstructed handwritten signature image when handwritten signature authentication is performed later on.

The normalization unit 590 may be configured to store collected handwritten signature image characteristics information (STAT), handwritten signature segment image characteristics information (F) and handwritten signature segment total behavioral characteristics information ($\omega$) as well as handwritten signature image.

The technology of normalization itself will not be further described in detail because it is well-known in voice recognition, character recognition, image recognition, etc.

Figure 2:
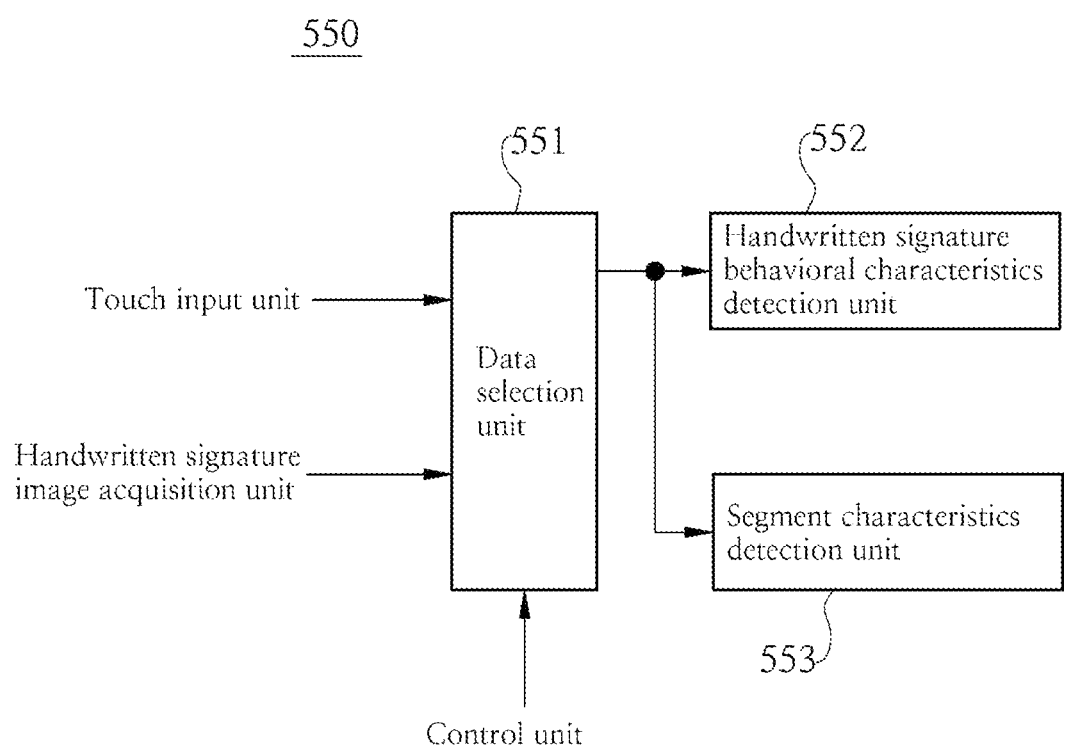
FIG. 2 is a diagram illustrating a configuration of a handwritten signature characteristics acquisition unit of a segment-based handwritten signature authentication system according to the exemplary embodiment of the present invention.

FIG. 2 is a diagram of a constitution of a handwritten signature characteristics acquisition unit of a segment-based handwritten signature authentication system according to the present invention.

Referring to FIG. 2, the handwritten signature characteristics acquisition unit 550 includes a handwritten signature behavioral characteristics detection unit 552 and a segment characteristics detection unit 553, and may further include a data selection unit 551 according to the exemplary embodiment of the present disclosure.

The data selection unit 551 receives touch data and the tracked handwritten signature image by being connected to the handwritten signature image acquisition unit 540 and the the touch input unit 420 of the handwritten signature input unit 400 or receives handwritten signature image data acquired through the scan unit 410, and outputs one of the handwritten signature image and touch data to the handwritten signature behavioral characteristics detection unit 552 and the segment characteristics detection unit 553 by the control of the control unit 510.

However, it is recommended that the handwritten signature characteristics acquisition unit 550 is configured to receive only touch data from the touch input unit 420 as it is difficult to disjoint handwritten signature segments from a handwritten signature image by analyzing the continuity of an image and analyze behavioral characteristics from a handwritten signature image.

The handwritten signature behavioral characteristics detection unit 552 receives the touch data that is output continuously from the touch input unit 420 of the handwritten signature input unit 400 and extracts the handwritten signature behavioral characteristics information ($\Phi$) from the position data and pressure data of the input touch data.

The segment characteristics detection unit 553 identifies the handwritten signature segments disjointed by a signer from the position data and pressure data of the touch data when the signature is handwritten, counts the number of the identified handwritten signature segments, creates each handwritten signature segment image corresponding with the identified handwritten signature segments, extracts the handwritten signature segment image characteristics information (F) from each handwritten signature segment image, and extracts the handwritten signature segment total behavioral characteristics information (ω) corresponding with the handwritten signature segments. The specific configuration and operation of the segment characteristics detection unit 553 will be described in detail with reference to FIGS. 3 to 5.

Figure 3:
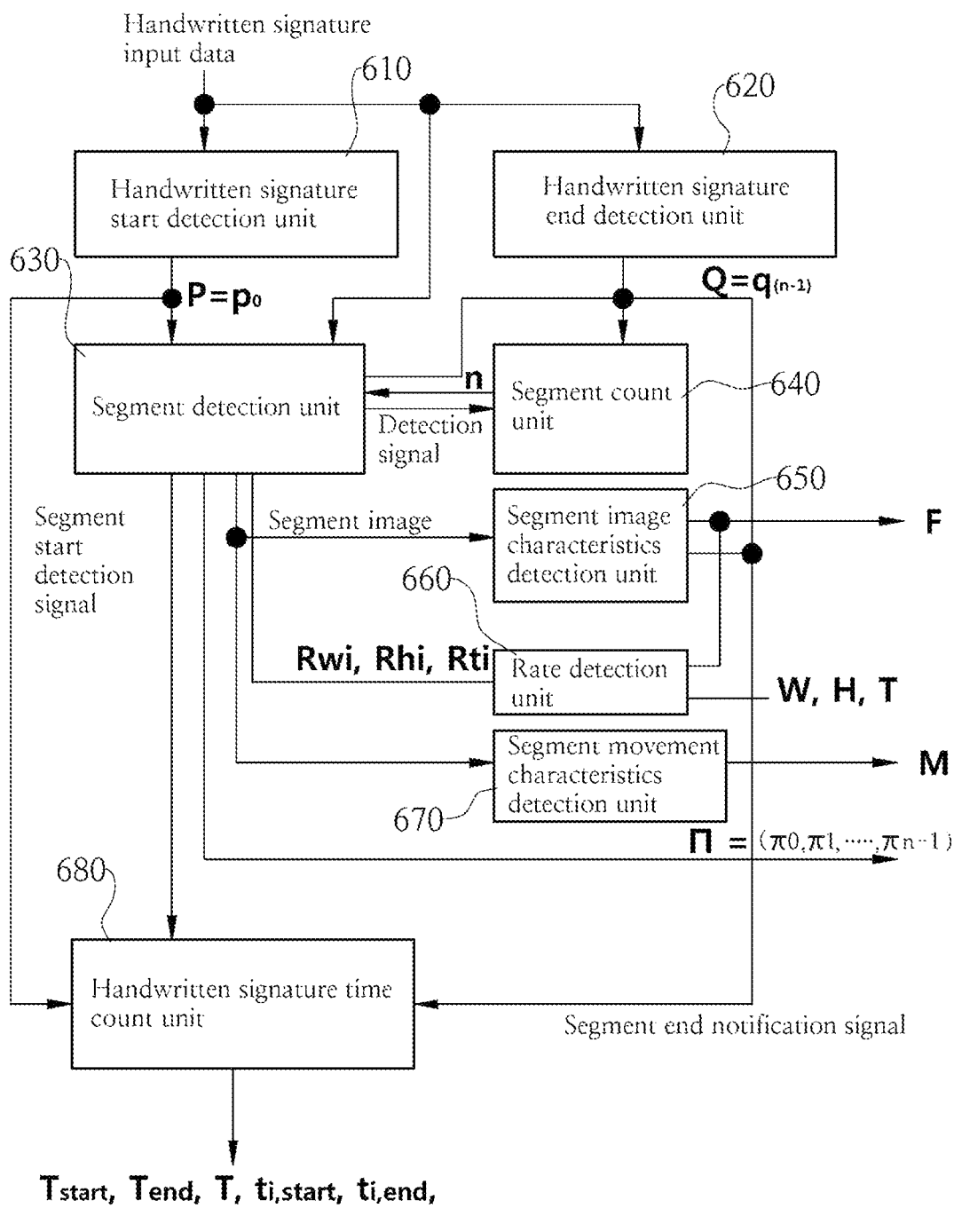
FIG. 3 is a diagram illustrating the essential configuration of a segment characteristics detection unit of a handwritten signature characteristics extraction unit in detail according to the exemplary embodiment of the present invention.
Figure 4:
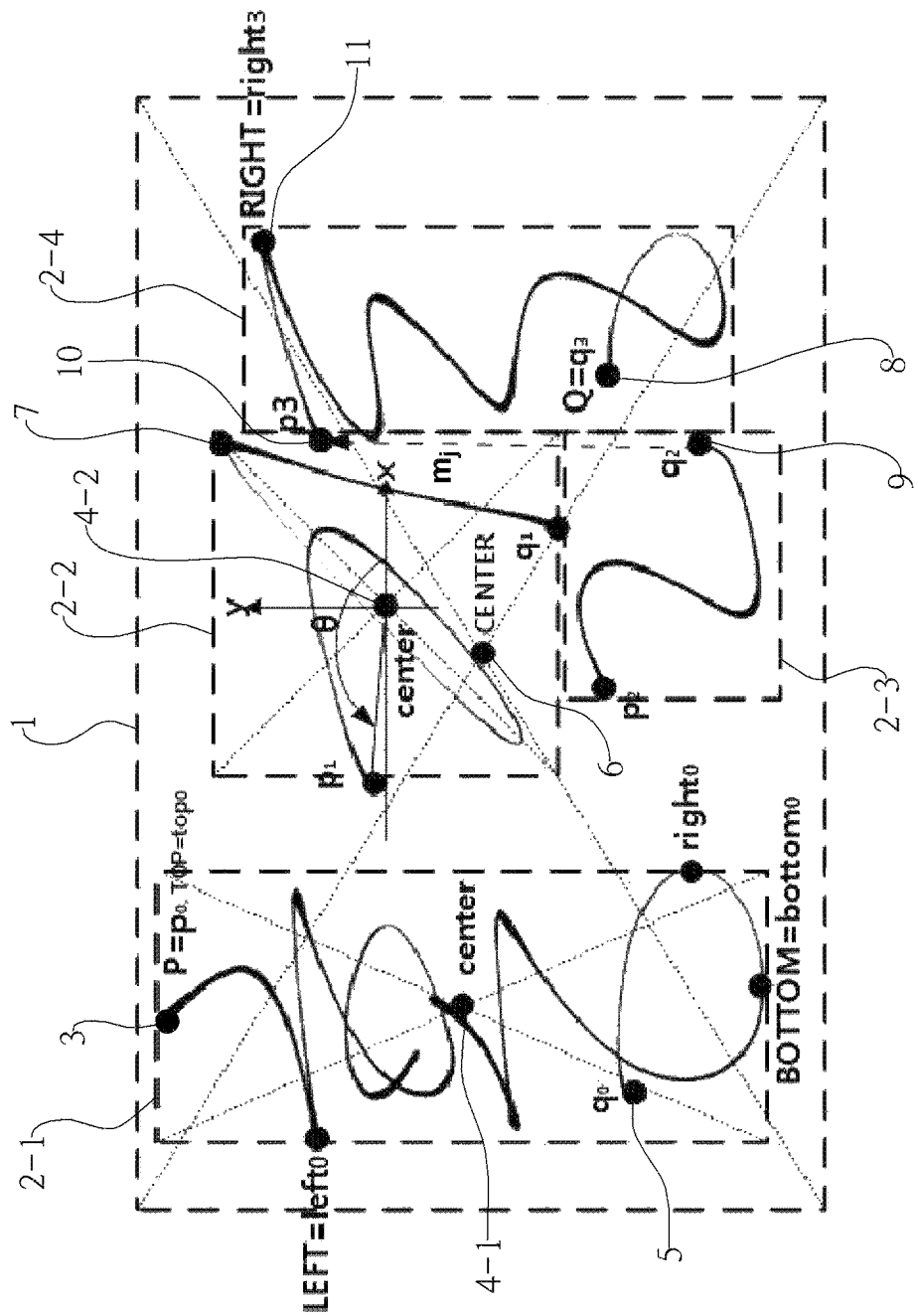
FIG. 4 is a diagram illustrating segmentation method and handwritten signature characteristics elements for a segment-based handwritten signature authentication according to the exemplary embodiment of the present invention.
Figure 5:
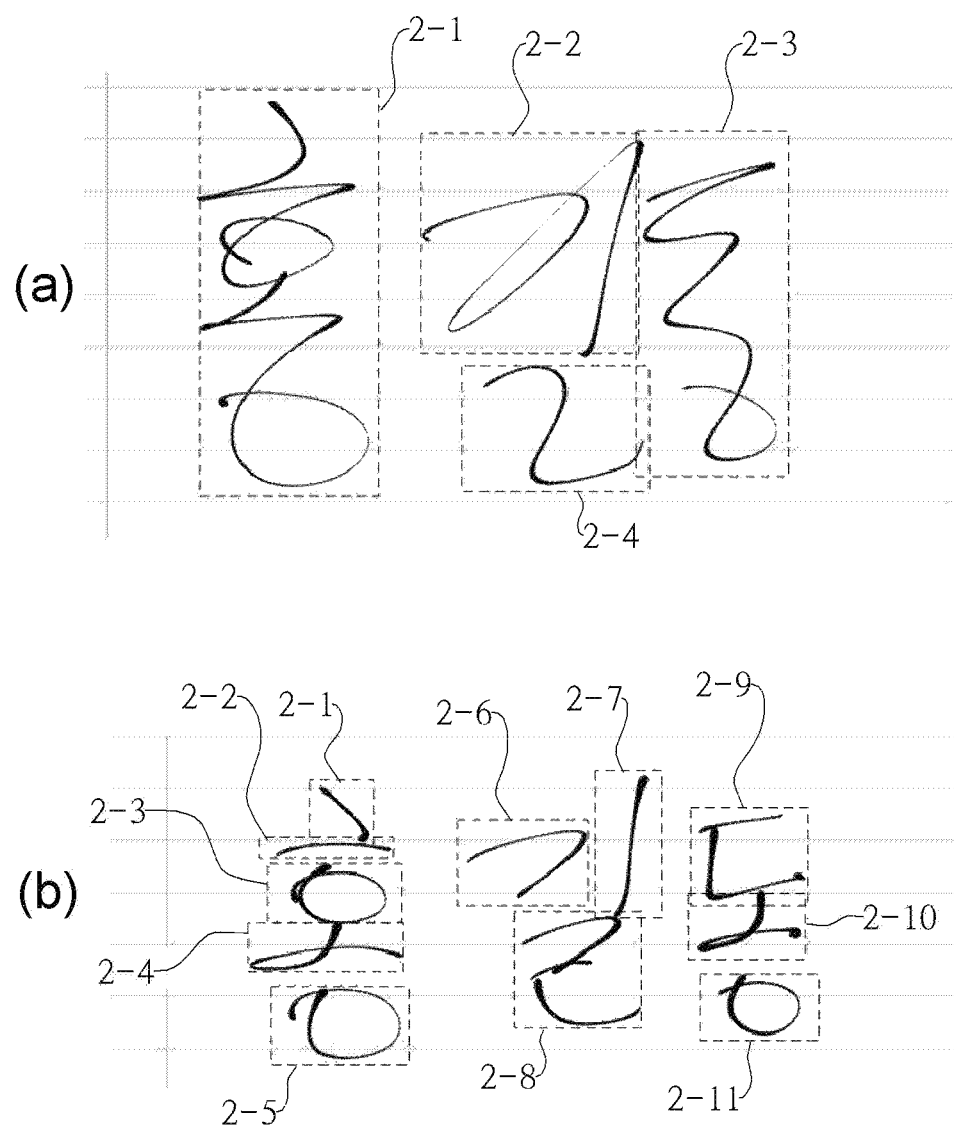
FIG. 5 is a diagram illustrating an example of handwritten signature having different numbers of segments for the same signature according to the exemplary embodiment of the present invention.

FIG. 3 is a diagram illustrating an essential configuration of the segment characteristics detection unit of a handwritten signature characteristics extraction unit in detail according to the exemplary embodiment of the present invention. FIG. 4 is a diagram illustrating segmentation method and handwritten signature characteristics elements for a segment-based handwritten signature authentication according to the exemplary embodiment of the present invention. FIG. 5 is a diagram illustrating an example of handwritten signature having different numbers of segments for the same signature according to the exemplary embodiment of the present invention.

Referring to FIGS. 3 to 5, the segment characteristics detection unit 553 includes a handwritten signature start detection unit 610, a handwritten signature end detection unit 620, a segment detection unit 630, a segment count unit 640, a segment image characteristics detection unit 650, a rate detection unit 660, a segment movement characteristics detection unit 670 and a handwritten signature time count unit 680.

The handwritten signature start detection unit 610, handwritten signature end detection unit 620 and handwritten signature time count unit 680 may be configured, as a common composition, in the handwritten signature behavioral characteristics detection unit 552 and segment characteristics detection unit 553.

Also, the handwritten signature start detection unit 610, handwritten signature end detection unit 620 and handwritten signature time count unit 680 may be configured in each of the handwritten signature behavioral characteristics detection unit 552 and segment characteristics detection unit 553.

The handwritten signature start detection unit 610 receives the continuous handwritten signature input data made by the handwritten signature from the touch input unit 400 when the signer handwrites a signature in the touch input unit 420 of the handwritten signature input unit 400 as shown in FIG. 4.

As the input of handwritten signature input data begins, the handwritten signature start detection unit 610 detects the handwritten signature start point (3) (P) as shown in FIG. 4. The handwritten signature start point (3) (P) is the start point ($p_0$) where the first handwritten signature segment starts.

The handwritten signature start detection unit 610 outputs the handwritten signature start point (P) information and the first handwritten signature segment start point (3) ($p_0$) (namely P=$p_0$) information, and outputs a handwritten signature start point detection signal to the segment detection unit 630.

The handwritten signature end detection unit 620 decides the end of a handwritten signature when there is no touch data input from the touch input unit 420 for a certain period time; decides the position corresponding with the position information of the last touch data, namely No. 8 in FIG. 4, as the end point; outputs the decided handwritten signature end point (8) (Q) (namely Q=$q_3$) information; and notifies the segment count unit 640 and the handwritten signature time count unit 680 of the end of the handwritten signature.

After a handwritten signature start point detection signal is entered from the handwritten signature start detection unit 610, the segment detection unit 630 detects the start point ($p_i$) and end point ($q_i$) of handwritten signature segments disjointed by the signer and by the position data and pressure data of the touch data, which is handwritten signature input data, and outputs a handwritten signature detection signal to the segment count unit 640 whenever a handwritten signature segment is detected. In FIGS. 4 and 5, for example, the signer writes "" the first Korean character of the signature in a single stroke, which means "" itself will be the first handwritten signature segment (2-1). Therefore, the segment detection unit 630 detects the start point (3) ($p_0$) and end point (5) ($q_0$) of the first handwritten signature segment (2-1), and detects the second handwritten signature segment (2-2) "" by detecting the start point ($p_1$) and end point ($q_1$) of the second handwritten signature segment (2-2).

In the case of (a) in FIGS. 4 and 5, the segment detection unit 630 detects a total of four handwritten signature segments and outputs a detection signal each time a segment is detected.

Furthermore, while tracking handwritten signature segments, the segment detection unit 630 generates and outputs segment images to the segment image characteristics detection unit 650, and generates and outputs handwritten signature segment behavioral characteristics information (Π) including the information such as the above Equation 6 and Equation 7.

The segment count unit 640 counts the number (n) of segments each time a segment detection signal is entered from the segment detection unit 630 and outputs the counted number (n) when the handwritten signature end notification signal is entered from the handwritten signature end detection unit 620. In the case of (a) in FIGS. 4 and 5, the segment count unit 640 outputs 4 as the counted number (n), and 11 as the counted number in the case of (b) in FIG. 5.

The segment image characteristics detection unit 650 extracts the figural and static characteristics of each input handwritten signature segment image if handwritten signature segment images are entered from the segment detection unit 630 to generate handwritten signature segment image characteristics information ($f_i$), and generates and outputs total handwritten signature segment image characteristics information (F) when handwritten signature segment image characteristics information for the last segment is detected.

To explain the handwritten signature segment image characteristics information extraction method for a handwritten signature segment with reference to FIG. 4, if the handwritten signature segment image for the second handwritten signature segment (2-2) in FIG. 4 is entered, the segment image characteristics detection unit 650 detects a top point ($top_1$), bottom point ($bottom_1$), leftmost point ($left_1$), rightmost point ($right_1$), center point ($center_1$) (4-2), extracts the position information of each point, and extracts and outputs information on the angles ($A.top_1$, $A.bottom_1$, $A.left_1$, $A.right_1$) of the points by setting the center point ($center_1$) (4-2) as the origin (0, 0) of the xy coordinate system. [In FIG. 4, $p_1$ is the leftmost point ($left_1$) of the second handwritten signature segment (2-2) and thus the value of $A.left_1$ is angle θ.]; information on the distances ($D.top_1$, $D.bottom_1$, $D.left_1$, $D.right_1$) from the center point ($center_1$) (4-2) to other points; the information on the width ($w_1$) and height ($h_1$) of the handwritten signature segment image; and information on the rates (Rate ($w_1$, $D.top_1$), Rate ($h_1.top_1$), Rate ($w_1$, $D.bottom_1$), Rate ($h_1.bottom_1$), Rate ($w_1$, $D.left_1$), Rate ($h_1.left_1$), Rate ($w_1$, $D.right_1$), Rate ($h_1.right_1$)) of the handwritten signature segment image.

Additionally, to explain the handwritten signature image characteristics information (STAT) extraction method in at least one of the handwritten signature image acquisition unit 540 and the handwritten signature behavioral characteristics detection unit 552 referring to FIG. 4, if the handwritten signature image like the one in FIG. 4 is acquired through the scan unit (410), by the handwritten signature tracking unit 530 or by the image reconstruction unit 570, the handwritten signature image acquisition unit 540 or the handwritten signature behavioral characteristics detection unit 552 detects the center point (CENTER) (6) of the entire handwritten signature image (1); the position information (TOP=$top_0$, BOTTOM=$bottom_0$, LEFT=$left_0$, RIGHT=$right_3$) of the top point (TOP), bottom point (BOTTOM), leftmost point (LEFT) and rightmost point (RIGHT); width (W); height (H); the angles (A.TOP, A.BOTTOM, A.LEFT, A.RIGHT) of each point by setting the center point (CENTER) as the origin (0, 0) of the xy coordinate system; distances (D.TOP, D.BOTTOM, D.LEFT, D.RIGHT) from the center point (CENTER) to each point; and the relative position information between points (DOT), and generates and outputs the handwritten signature image characteristics information (STAT) including the above described information.

The rate detection unit 660 receives handwritten signature segment image characteristics information from the segment image characteristics detection unit 650, receives the width (W), height (H) and the total handwritten signature elapsed time (T) of the entire handwritten signature image (1) from the handwritten signature image acquisition unit 540, calculates the rates ($Rw_i$, $Rh_i$, $Rt_i$) of the width ($w_i$), height ($h_i$) and the segment elapsed time of each handwritten signature segment against the width (W), height (H) and the total handwritten signature elapsed time (T) of the entire handwritten signature image (1) respectively, and sends the rate information to the segment detection unit 630.

The segment movement characteristics detection unit 670 receives at least one of the handwritten signature segment image and touch data from the segment detection unit 630, and extracts and outputs movement behavioral characteristics information ($m_j$) between the detected handwritten signature segments from both handwritten signature segment images and touch data. It is recommended that the segment movement characteristics detection unit 670 receive the touch data from among the handwritten signature segment image and touch data for extraction of the movement behavioral characteristics information ($m_j$) between segments. In FIG. 4, the movement is made from the end point (9) ($q_2$) of the third segment (2-3) to the start point (10) ($p_3$) of the fourth segment (2-4), and thus the movement behavioral characteristics information ($m_j$) from the segment (2-3) to the segment (2-4) becomes $m_3$ (Here, j=3).

Figure 6:
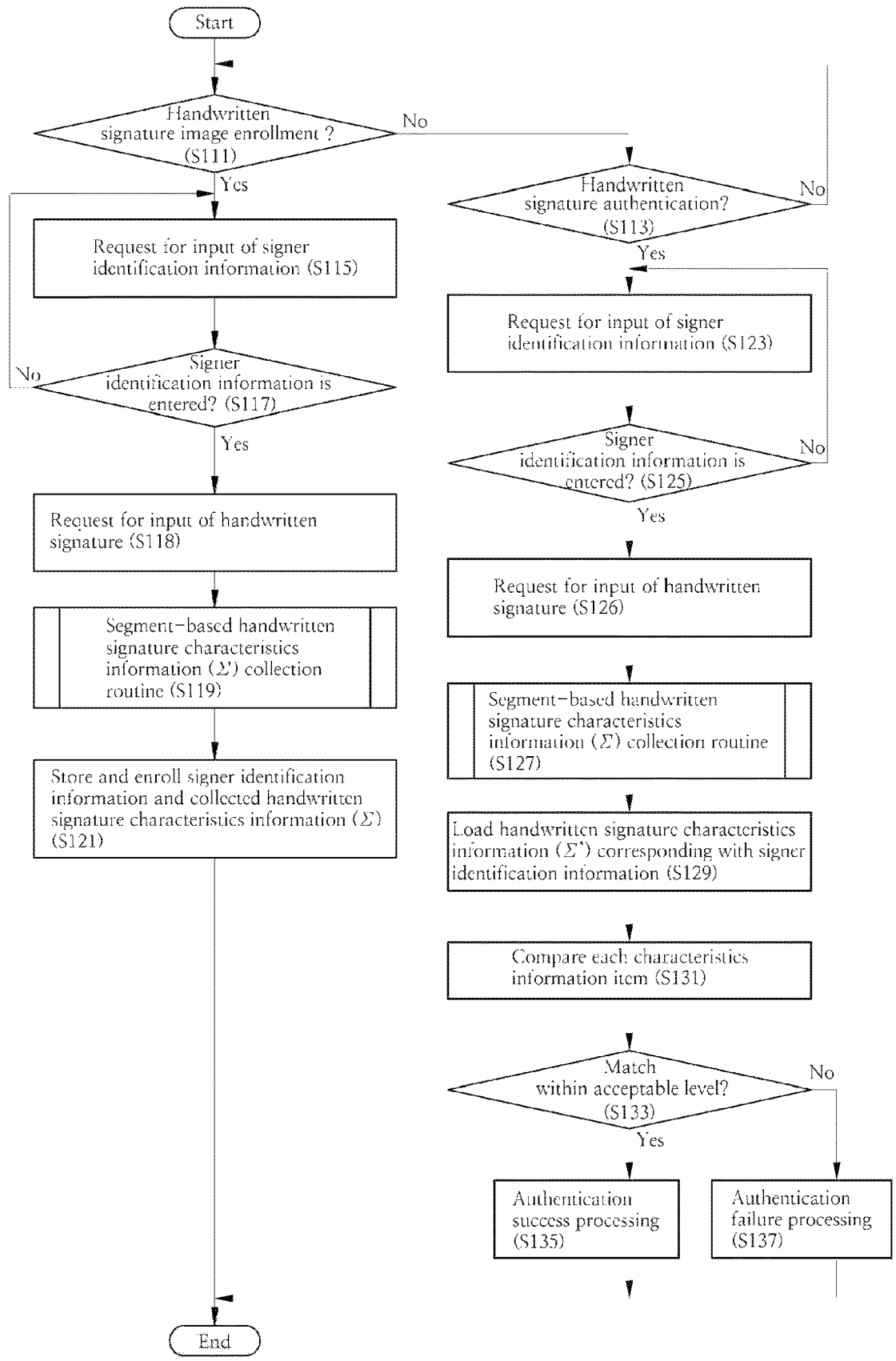
FIG. 6 is a flowchart illustrating a segment-based handwritten signature authentication method according to the exemplary embodiment of the present invention.

FIG. 6 is a flowchart illustrating a segment-based handwritten signature authentication method according to the exemplary embodiment of the present invention.

Referring to FIG. 6, a control unit 510 monitors whether handwritten signature enrollment is requested by a command for handwritten signature image enrollment (S111) or whether handwritten signature authentication is requested by a command for handwritten signature authentication (S113) from an input unit 200.

When a handwritten signature enrollment request is made, the control unit 510 requests the input of signer identification information (S115) and monitors whether the signer identification information is entered (S117).

After the signer identification information is entered, the signer is requested to handwrite a signature (S118).

After the request for the handwritten signature, the control unit 510 collects segment-based handwritten signature characteristics information by performing a segment-based handwritten signature characteristics information collection routine (S119), maps the collected segment-based handwritten signature characteristics information to the signer identification information, and stores the collected segment-based handwritten signature characteristics information in an enrollment unit 100 (S121).

Meanwhile, when a handwritten signature authentication request is made, the control unit 510 requests the input of signer identification information (S123) and monitors whether the signer identification information is entered (S125).

After the signer identification information is entered, the control unit 510 requests the input of a handwritten signature through the output unit 300 (S126).

After the request for the handwritten signature, the control unit 510 collects segment-based handwritten signature characteristics information (S) by performing a segment-based handwritten signature characteristics information collection routine through a handwritten signature characteristics extraction unit 520 (S127), and load from the enrollment unit 100 the enrolled handwritten signature characteristics information ($\Sigma'$) that corresponds with the input signer identification information through a segment handwritten signature authentication unit 560 (S129).

After the enrolled handwritten signature characteristics information ($\Sigma'$) is loaded, the control unit 510 compares the number (n') of segments of the enrolled handwritten signature characteristics information ($\Sigma'$) with the number (n) of segments of the collected handwritten signature characteristics information ($\Sigma$); the enrolled handwritten signature segment image characteristics information (F') with the collected handwritten signature segment image characteristics information (F); the enrolled handwritten signature segment behavioral characteristics information ($\Pi'$) with the collected handwritten signature segment behavioral characteristics information ($\Pi$); the enrolled handwritten signature image characteristics information (STAT') with the collected handwritten signature image characteristics information (STAT); and the enrolled handwritten signature segment movement behavioral characteristics information (M') with the collected handwritten signature segment movement behavioral characteristics information (M) through the segment handwritten signature authentication unit 560 (S131). The control unit 510 may further compare the enrolled handwritten signature behavioral characteristics information ($\Phi'$) with the collected handwritten signature behavioral characteristics information ($\Phi$).

The control unit 510 determines, through the segment handwritten signature authentication unit 560, whether a match rate for each characteristics information item reaches the predetermined match rate (S133), conducts authentication failure processing if the match rate is below the predetermined match rate (S137). If the match rate is above the predetermined match rate, the control unit 510 conducts authentication success processing (S135).

Figure 7:
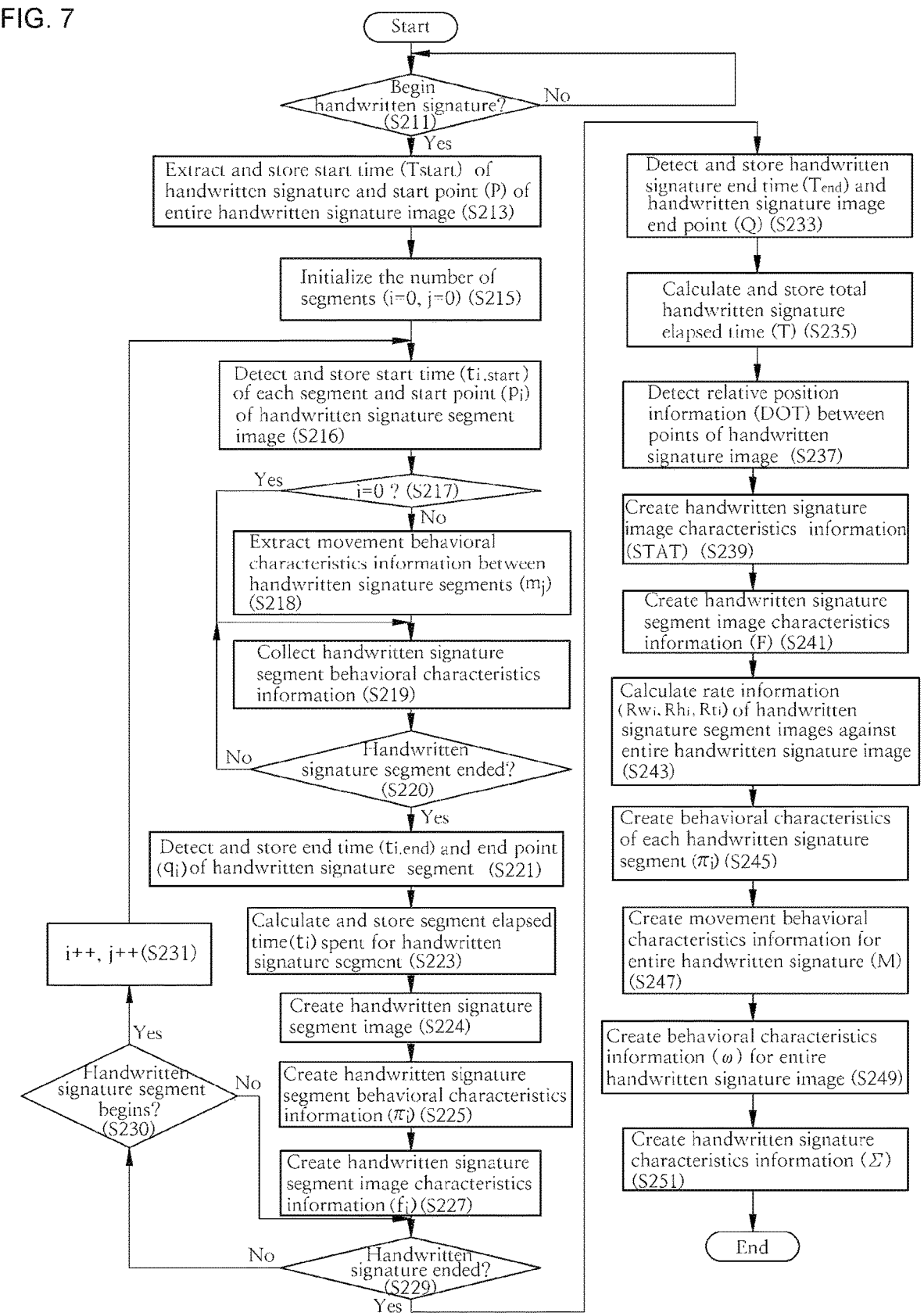
FIG. 7 is a flowchart illustrating a handwritten signature characteristics information collection method of a segment-based handwritten signature authentication method according to the exemplary embodiment of the present invention.

FIG. 7 is a flowchart illustrating a handwritten signature characteristics information collection method of a segment-based handwritten signature authentication method according to the exemplary embodiment of the present invention. The handwritten signature characteristics information collection method of the segment-based handwritten signature authentication method will be described below with reference to FIG. 7.

The control unit 510 monitors whether touch data, which is handwritten signature input data, begins to be entered from the touch input unit 420 through one or more of handwritten signature tracking unit 530, handwritten signature image acquisition unit 540 and handwritten signature characteristics acquisition unit 550 (S211).

When the user starts handwriting a signature during monitoring, the control unit 510 first detects a start time ($T_{start}$) of the handwritten signature and a start point (P) of the handwritten signature image which is the start point of the entire handwritten signature image through one of the handwritten signature tracking unit 530, handwritten signature image acquisition unit 540 and handwritten signature characteristics acquisition unit 550, and stores the information of the detected start time ($T_{start}$) and the start point (P) (S213).

If it is determined that handwriting the signature begins and the start time ($T_{start}$) of the handwritten signature and the start point (P) of the handwritten signature image are detected, the control unit 510 initializes (i=0, j=0) the segment count variables (i, j) (S215).

When the handwritten signature segment count variables are initialized, the control unit 510 performs handwritten signature segment characteristics information collection routine (S216~S230).

To be more specific, the control unit 510 detects and stores a start time ($t_{i,start}$) of each handwritten signature segment and a start point ($p_i$) of each handwritten signature segment after initializing the segment count variables (S216).

When the start time ($t_{i,start}$) of each handwritten signature segment and the start point ($p_i$) of each handwritten signature segment are detected and stored, the control unit 510 checks whether the handwritten signature count variable (i) is zero (S217). The purpose of checking whether the handwritten signature count variable (i) is zero is to determine whether the handwritten signature segment that is currently collecting the segment characteristics information is the first handwritten signature segment.

When the current handwritten signature segment is the first handwritten signature segment, the control unit collects handwritten signature segment behavioral characteristics information ($\Pi_i$) of the current handwritten signature segment (S219).

On the other hand, when the current handwritten signature segment is not the first handwritten signature segment, the control unit 510 extracts movement behavioral characteristics information between handwritten signature segments ($m_j$) (S218) and collects handwritten signature segment behavioral characteristics data of each handwritten signature segments (S219).

After the handwritten signature segment behavioral characteristics data begins to be collected, the control unit 510 determines whether the handwritten signature segment is ended (S220).

If it is determined that one of the handwritten signature segments is ended, the control unit 510 loads and stores an end time ($t_{i,end}$) of the segment; detects and stores an end point ($q_i$) of the handwritten signature segment (S221); and calculates and stores the segment elapsed time ($t_i$) spent for the handwritten signature segment (S223).

In addition, the control unit 510 creates and stores the handwritten signature segment image ($s_i$) (S224).

And, as one of the handwritten signature segments is detected and ended, the control unit 510 creates handwritten signature segment behavioral characteristics information ($\Pi_i$) by the collected handwritten signature segment behavioral characteristics data (S225), creates handwritten signature segment image characteristics information ($f_i$) (S227), and stores them in the enrollment unit 100.

After the handwritten signature segment image characteristics information ($f_i$) corresponding with one of the handwritten signature segments is created, the control unit 510 determines whether the handwritten signature is ended (S229) or the next handwritten signature segment begins (S230). The end of handwritten signature may be determined when the touch data is not entered for a certain time from the touch input unit 420 of the handwritten signature input unit 400, and the beginning of the next handwritten signature segment may be determined if the touch data is entered again within a certain time.

If the beginning of the next handwritten signature segment is detected, the control unit 510 increases the handwritten signature number count variables (i, j) by one (S231) and performs the handwritten signature segment characteristics information collection routine repeatedly.

On the other hand, if it is determined that the handwritten signature is ended, the control unit 510 loads and stores a handwritten signature end time ($T_{end}$), and detects and stores a handwritten signature image end point (Q) (S233).

After the handwritten signature end time is stored, the control unit 510 calculates and stores total handwritten signature elapsed time (T) spent for the entire handwritten signature (S235).

After then, the control unit 510 detects the relative position information (DOT) between the points (CENTER, RIGHT, LEFT, BOTTOM) of the handwritten signature image (S237).

After detecting the DOT, the control unit 510 creates the handwritten signature image characteristics information (STAT) (S239) and the total handwritten signature segment image characteristics information (F) for all the handwritten signature segments (S241).

After all the above information is created, the control unit 510 calculates the rate information ($Rw_i$, $Rh_i$, $Rt_i$) of handwritten signature segment images against the entire handwritten signature image (S243) and creates the total handwritten signature segment behavioral characteristics information ($\Pi$) combining the behavioral characteristics information of each handwritten signature segment ($\Pi_i$) (S245).

After creating the total handwritten signature segment behavioral characteristics information ($\Pi$), the control unit 510 creates the movement behavioral characteristics information (M) for the entire handwritten signature combining the movement behavioral characteristics information ($m_j$) between handwritten signature segments (S247).

After creating the handwritten signature segment total behavioral characteristics information and the total movement behavioral characteristics information (M), the control unit 510 creates the behavioral characteristics information (ω) for the entire handwritten signature image (S249).

When all the above information is created, the control unit 510 finally creates the handwritten signature characteristics information (Σ) including all above information and stores the handwritten signature characteristics information (Σ) in the enrollment unit 100 (S251).

Meanwhile, the present invention is not limited to the above-described exemplary embodiments and it may be easily understood by those skilled in the art that various modifications, changes, substitutions or additions may be made without departing from the spirit and scope of the invention. When the practice of such modifications, changes, substitutions or additions are within the scope of the appended claims, the technical idea should also be regarded as belonging to the present invention.

DESCRIPTION OF THE REFERENCE NUMERALS IN THE DRAWINGS

1: handwritten signature image
2: handwritten signature segment (image)
10: handwritten signature characteristics data enrollment unit
11: handwritten signature image characteristics data DB
12: handwritten signature behavioral characteristics data DB
20: handwritten signature segment characteristics data enrollment unit
21: handwritten signature segment image characteristics data DB
22: handwritten signature segment behavioral characteristics data DB
100: enrollment unit
200: input unit
300: output unit
400: handwritten signature input unit
410: scan unit
420: touch input unit
500: handwritten signature authentication unit
510: control unit
520: handwritten signature characteristics extraction unit
530: handwritten signature tracking unit
540: handwritten signature image acquisition unit
550: handwritten signature characteristics acquisition unit
551: data selection unit
552: handwritten signature behavioral characteristics detection unit
553: segment characteristics detection unit
560: segment handwritten signature authentication unit
570: image reconstruction unit
580: comparison unit
590: normalization unit
610: handwritten signature start detection unit
620: handwritten signature end detection unit
630: segment detection unit
640: segment count unit
650: segment image characteristics detection unit
660: rate detection unit
670: segment movement characteristics detection unit
680: handwritten signature time count unit

The invention claimed is:

1. A segment-based handwritten signature authentication system, the system comprising:
a handwritten signature input unit that includes a touch input unit that outputs touch data, as handwritten signature input data, including position data and pressure data with respect to positions that are touched by a signer for a handwritten signature;
an enrollment unit that enrolls handwritten signature characteristics information of each signer; and
a handwritten signature authentication unit that identifies and counts handwritten signature segments disjointed by the signer from the handwritten signature input data entered from the handwritten signature input unit,
collects handwritten signature characteristics information ($\Sigma$) including characteristics information of the entire handwritten signature and the handwritten signature segments with the counted number of the handwritten signature segments,
maps the collected handwritten signature characteristics information to identification information of the signer, enrolls the collected handwritten signature characteristics information in the enrollment unit,
collects handwritten signature characteristics information ($\Sigma$) including behavioral characteristics information of the handwritten signature and the handwritten signature segments from the touch data entered through the touch input unit of the handwritten signature input unit upon request for handwritten signature authentication,
loads the enrolled handwritten signature characteristics information ($\Sigma'$) that corresponds with the identification information of the signer who requests the handwritten signature authentication, and
performs a segment-based handwritten signature authentication according to a match rate by comparing the enrolled handwritten signature characteristics information ($\Sigma'$) with the collected handwritten signature characteristics information ($\Sigma$).

2. The system of claim 1, wherein the handwritten signature authentication unit includes:
a handwritten signature characteristics extraction unit that extracts the handwritten signature characteristics information ($\Sigma$) including a handwritten signature image, handwritten signature image characteristics information (STAT), handwritten signature segment image characteristics information (F) of the handwritten signature segments that constitutes the handwritten signature, and handwritten signature segment total behavioral characteristics information ($\omega$) from the handwritten signature input data entered through the touch input unit of the handwritten signature input unit;
a segment handwritten signature authentication unit that performs handwritten signature authentication according to each predetermined match rate by comparing the handwritten signature image characteristics information (STAT) extracted through the handwritten signature characteristics extraction unit with the enrolled handwritten signature image characteristics information (STAT') corresponding with the pre-enrolled identification information of the signer who requests handwritten signature authentication, comparing the handwritten signature segment image characteristics information (F) with the pre-enrolled handwritten signature segment image characteristics information (F'), and comparing the handwritten signature segment total behavioral characteristics information ($\omega$) with the pre-enrolled handwritten signature segment total behavioral characteristics information ($\omega'$); and
a control unit that saves and enrolls the handwritten signature characteristics information, as extracted through the handwritten signature characteristics extraction unit, to the enrollment unit at time of request for enrollment and performs handwritten signature authentication by controlling the segment handwritten signature authentication unit at time of request for handwritten signature authentication.

3. The system of claim 1, wherein the handwritten signature characteristics extraction unit includes:
a handwritten signature tracking unit that detects and outputs the position data included in the touch data of the handwritten signature input data entered from the handwritten signature input unit;
a handwritten signature image acquisition unit that creates a tracked handwritten signature image from the position data entered from the handwritten signature tracking unit, extracts the handwritten signature image characteristics information (STAT) from the tracked handwritten signature image, and outputs the extracted handwritten signature image characteristics information (STAT) together with the tracked handwritten signature image; and a handwritten signature characteristics acquisition unit that outputs total handwritten signature segment image characteristics information (F) and handwritten signature segment total behavioral characteristics information (ω) extracted from the touch data.

4. The system of claim 3, wherein the handwritten signature characteristics acquisition unit includes:

a segment characteristics detection unit that identifies and counts the segments of the handwritten signature from the touch data, creates handwritten signature segment images of the identified segments, extracts handwritten signature segment total behavioral characteristics information (ω) including the handwritten signature segment image characteristics information (F) of the handwritten signature segment images and handwritten signature segment behavioral characteristics information (Π), and outputs handwritten signature segment characteristics information including the handwritten signature segment image characteristics information (F) and the handwritten signature segment total behavioral characteristics information (ω).

5. The system of claim 4, wherein the segment characteristics detection unit further extracts handwritten signature segment movement behavioral information (M) created by movements between the handwritten signature segments and outputs the handwritten signature segment total behavioral characteristics information (ω) that further includes the extracted handwritten signature segment movement behavioral information (M).

6. The system of claim 4, wherein the handwritten signature segment image characteristics information (F), as figural characteristics information of handwritten signature segment image, includes:

position information on a start point ($p_i$) and an end point ($q_i$) of each handwritten signature segment, a width ($w_i$) and a height ($h_i$) of the handwritten signature segment, a center point ($center_i$), a top point ($top_i$), a bottom point ($bottom_i$), a leftmost point ($left_i$) and a rightmost point ($right_i$) of the handwritten signature segment;

information on angles ($A.top_i$, $A.bottom_i$, $A.left_i$, $A.right_i$) and distances ($D.top_i$, $D.bottom_i$, $D.left_i$, $D.right_i$) between each point and the center point ($center_i$); and information on a rate (RATE ($w_i$, $D.top_i$)) of distance ($D.top_i$) to the top point against the width ($w_i$), a rate (RATE ($w_i$, $D.bottom_i$)) of distance ($D.bottom_i$) to the bottom point against the width ($w_i$), a rate (RATE ($w_i$, $D.left_i$)) of distance ($D.left_i$) to the leftmost point against the width ($w_i$), a rate (RATE ($w_i$, $D.right_i$)) of distance ($D.right_i$) to the rightmost point against the width ($w_i$), a rate (RATE ($h_i$, $D.top_i$)) of distance ($D.top_i$) to the top point against the height ($h_i$), a rate (RATE ($h_i$, $D.bottom_i$)) of distance ($D.bottom_i$) to the bottom point against the height ($h_i$), a rate (RATE ($h_i$, $D.left_i$)) of distance ($D.left_i$) to the leftmost point against the height ($h_i$), and a rate (RATE ($h_i$, $D.right_i$)) of distance ($D.right_i$) to the rightmost point against the height ($h_i$).

7. The system of claim 4, wherein the handwritten signature segment behavioral characteristics information (Π), as information created by the signer's behavioral habits of writing the handwritten signature segments, includes:

position information on a start point ($p_i$) and an end point ($q_i$) of each segment;

information on a start time ($t_{i.start}$) and an end time ($t_{i.end}$) of each segment;

information on a width ($w_i$) and a height ($h_i$) of each handwritten signature segment image;

information on a segment elapsed time ($t_i$) spent for each handwritten signature segment; and information on a rate ($Rw_i$) of the width ($w_i$) of each handwritten signature segment image against a width (W) of the handwritten signature image, a rate ($Rh_i$) of the height ($h_i$) of each handwritten signature segment image against a height (H) of the handwritten signature image, and a rate ($Rt_i$) of the segment elapsed time ($t_i$) spent for each handwritten signature segment against total handwritten signature elapsed time (T) spent for the entire handwritten signature.

8. The system of claim 5, wherein the handwritten signature segment movement behavioral characteristics information (M) includes, information on an angle ($a_j$) of an imaginary line connected from an end point ($q_{j-1}$) of an arbitrary $1^{st}$ segment to a start point ($p_j$) of an arbitrary $2^{nd}$ segment in the xy coordinate system;

information on a segment distance ($d_j$) from an end point ($q_{j-1}$) of an arbitrary $1^{st}$ segment to a start point ($p_j$) of an arbitrary $2^{nd}$ segment in the xy coordinate system;

information on a segment movement elapsed time ($\Delta_j$) spent for moving from an end point ($q_{j-1}$) of an arbitrary $1^{st}$ segment to a start point ($p_j$) of an arbitrary $2^{nd}$ segment in the xy coordinate system; and information on a rate ($\delta w_j$) of the segment distance ($d_j$) against the width (W) of handwritten signature image, a rate ($\delta h_j$) of the segment distance ($d_j$) against the height (H) of handwritten signature image, and a rate ($\delta t_j$) of the segment movement elapsed time ($\Delta_j$) against the total handwritten signature elapsed time (T) spent for entire handwritten signature.

9. The system of claim 3, wherein the handwritten signature authentication unit further includes:

an image reconstruction unit that regenerates a reconstructed handwritten signature image by using the tracked handwritten signature image, the handwritten signature segment image characteristics information (F), the handwritten signature segment images, and the handwritten signature segment total behavioral characteristics information (ω); and a comparison unit comparing the reconstructed handwritten signature image with the tracked handwritten signature image to determine whether the reconstructed handwritten signature image and the tracked handwritten signature image are matched when each of the enrollment and the authentication is successful and outputting the match result to the the control unit, wherein the control unit saves and enrolls the handwritten signature characteristics information (Σ) to the enrollment unit or decides that the result of the handwritten signature authentication is finally successful if the match result entered from the comparison unit is successful.

10. The system of claim 9, wherein the handwritten signature authentication unit further includes:

a normalization unit adding the reconstructed handwritten signature image to reconstructed handwritten signature images previously stored in the enrollment unit when each of the enrollment and the authentication is successful, normalizing the reconstructed handwritten signature image, and storing the normalized handwritten signature image, wherein
the comparison unit compares the input reconstructed handwritten signature image with the normalized handwritten signature image and performs handwritten signature authentication according to whether the input reconstructed handwritten signature image and the normalized handwritten signature image are matched.

11. The system of claim 9, wherein the handwritten signature authentication unit further includes:
a normalization unit adding the collected handwritten signature characteristics information ($\Sigma$) to handwritten signature characteristics information ($\Sigma'$) previously stored in the enrollment unit when each of the enrollment and the authentication is successful, normalizing the handwritten signature characteristics information, and storing the normalized handwritten signature characteristics information ($\Sigma''$) in the enrollment unit, wherein
the comparison unit performs handwritten signature characteristics authentication according to whether a match result is successful by comparing the input handwritten signature characteristics information ($\Sigma$) with the normalized handwritten signature characteristics information ($\Sigma''$), compares the reconstructed handwritten signature image with the normalized handwritten signature image if the result of handwritten signature characteristics authentication is successful, and outputs a match result according to whether the reconstructed handwritten signature image and the normalized handwritten signature image are matched, and
the control unit performs handwritten signature authentication according to whether the input handwritten signature characteristics information ($\Sigma$) and the normalized handwritten signature characteristics information ($\Sigma''$) are matched and whether the reconstructed handwritten signature image and the normalized handwritten signature image are matched and, if both of the above authentications are successful, concludes that user authentication is finally successful.

12. A segment-based handwritten signature authentication method, the method comprising:
an enrollment process in which a handwritten signature authentication unit identifies and counts segments disjointed by a signer from handwritten signature input data entered through a handwritten signature input unit, collects handwritten signature characteristics information ($\Sigma$) including characteristics information of entire handwritten signature and handwritten signature segments with the counted number of the segments, maps the handwritten signature characteristics information to identification information of the signer, and enrolls the handwritten signature characteristics information in the enrollment unit; and
a handwritten signature authentication process in which the handwritten signature authentication unit collects handwritten signature characteristics information ($\Sigma$) including characteristics information of entire handwritten signature and handwritten signature segments from touch data entered through a touch input unit of the handwritten signature input unit upon request for handwritten signature authentication, and performs handwritten signature authentication according to a match rate by loading the enrolled handwritten signature characteristics information ($\Sigma'$) that corresponds with the identification information of the signer who requests handwritten signature authentication and comparing the enrolled handwritten signature characteristics information ($\Sigma'$) with the collected handwritten signature characteristics information ($\Sigma$).

13. The method of claim 12, wherein the enrollment process includes:
an enrollment request monitoring step that monitors whether a handwritten signature enrollment request is made;
a signer identification information acquisition step that acquires the signer identification information to be enrolled upon request for handwritten signature enrollment;
a handwritten signature characteristics information acquisition step that acquires the handwritten signature characteristics information ($\Sigma$) from the touch data entered through the touch input unit of the handwritten signature input unit; and
a handwritten signature enrollment step that maps the handwritten signature characteristics information to the identification information of the signer and enrolls the handwritten signature characteristics information in the enrollment unit.

14. The method of claim 12, wherein the handwritten signature authentication process includes:
a handwritten signature authentication request monitoring step that monitors whether a handwritten signature authentication request is made;
a signer identification information acquisition step that acquires the signer identification information when the handwritten signature authentication request is made;
a handwritten signature characteristics information acquisition step that acquires the handwritten signature characteristics information ($\Sigma$) from the touch data entered through the touch input unit regarding to the handwritten signature of the signer;
an enrolled handwritten signature characteristics information loading step that loads the pre-enrolled handwritten signature characteristics information ($\Sigma'$) corresponding with the acquired signer identification information; and
a handwritten signature authentication step that performs handwritten signature authentication by comparing the acquired handwritten signature characteristics information ($\Sigma$) with the loaded handwritten signature characteristics information ($\Sigma'$) and outputs a result of the authentication.

15. The method of claim 12, wherein the handwritten signature characteristics information ($\Sigma$) acquisition step includes:
a handwritten signature tracking step that begins tracking the handwritten signature from the touch data of the handwritten signature input data entered from the handwritten signature input unit;
a handwritten signature segment characteristics information extraction step that identifies and counts the handwritten signature segments disjointed by the signer from the touch data when the handwritten signature tracking begins, creates each handwritten signature segment image, acquires the handwritten signature segment total behavioral characteristics information ($\omega$) that is the behavioral characteristics information of each handwritten signature segment, and also acquires handwritten signature segment image characteristics information (F) from each handwritten signature segment image when each handwritten signature segment image is created; and a handwritten signature characteristics information extraction step that acquires the handwritten signature image when the signer finishes handwriting the signature, acquires handwritten signature behavioral characteristics information ($\Phi$) corresponding with the acquired handwritten signature image, and acquires handwritten signature image characteristics information (STAT) for the acquired handwritten signature image.

16. The method of claim 15, wherein the handwritten signature segment characteristics information extraction step further includes:
    extracting handwritten signature segment movement behavioral characteristics information (M) that is generated by movements between the disjointed handwritten signature segments
    and adding the extracted handwritten signature segment movement behavioral information (M) to the handwritten signature segment total behavioral characteristics information ($\omega$).

17. The method of claim 16, wherein the handwritten signature segment image characteristics information (F), as figural characteristics information of handwritten signature segment image, includes:
    position information on a start point ($p_i$) and an end point ($q_i$) of each handwritten signature segment, a width ($w_i$) and a height ($h_i$) of the handwritten signature segment, a center point ($center_i$), a top point ($top_i$), a bottom point ($bottom_i$), a leftmost point ($left_i$) and a rightmost point ($right_i$) of the handwritten signature segment;
    information on angles (A.$top_i$, A.$bottom_i$, A.$left_i$, A.$right_i$) and distances (D.$top_i$, D.$bottom_i$, D.$left_i$, D.$right_i$) between each point and the center point ($center_i$); and
    information on a rate (RATE ($w_i$, D.$top_i$)) of distance (D.$top_i$) to the top point against the width ($w_i$), a rate (RATE ($w_i$, D.$bottom_i$)) of distance (D.$bottom_i$) to the bottom point against the width ($w_i$), a rate (RATE ($w_i$, D.$left_i$)) of distance (D.$left_i$) to the leftmost point against the width ($w_i$), a rate (RATE ($w_i$, D.$right_i$)) of distance (D.$right_i$) to the rightmost point against the width ($w_i$), a rate (RATE ($h_i$, D.$top_i$)) of distance (D.$top_i$) to the top point against the height ($h_i$), a rate (RATE ($h_i$, D.$bottom_i$)) of distance (D.$bottom_i$) to the bottom point against the height ($h_i$), a rate (RATE ($h_i$, D.$left_i$)) of distance (D.$left_i$) to the leftmost point against the height ($h_i$), and a rate (RATE ($h_i$, D.$right_i$)) of distance (D.$right_i$) to the rightmost point against the height ($h_i$).

18. The method of claim 15, wherein the handwritten signature characteristics information ($\Sigma$) acquisition step further comprises:
    a handwritten signature segment behavioral characteristics information ($\Pi$) acquisition step including, as characteristics information created by signer's behavioral habits of writing the handwritten signature segments,
    position information on a start point ($p_i$) and an end point ($q_i$) of each handwritten signature segment;
    information on a start time ($t_{i.start}$) and an end time ($t_{i.end}$) of each handwritten signature segment;
    information on a width ($w_i$) and a height ($h_i$) of each handwritten signature segment image;
    information on a segment elapsed time ($t_i$) spent for each handwritten signature segment; and
    information on a rate ($Rw_i$) of the width ($w_i$) of each handwritten signature segment image against the width (W) of the handwritten signature image, a rate ($Rh_i$) of the height ($h_i$) of each handwritten signature segment image against the height (H) of the handwritten signature image, and a rate ($Rt_i$) of the segment elapsed time ($t_i$) spent for each handwritten signature segment against the total handwritten signature elapsed time (T) spent for the entire handwritten signature.

19. The method of claim 16, wherein the handwritten signature segment movement behavioral characteristics information (M) includes:
    information on an angle ($a_j$) of an imaginary line connected from an end point ($q_{j-1}$) of an arbitrary $1^{st}$ segment to a start point ($p_j$) of an arbitrary $2^{nd}$ segment in the xy coordinate system;
    information on a segment distance ($d_j$) from an end point ($q_{j-1}$) of an arbitrary $1^{st}$ segment to a start point ($p_j$) of an arbitrary $2^{nd}$ segment in the xy coordinate system;
    information on a segment movement elapsed time ($\Delta_j$) spent for moving from an end point ($q_{j-1}$) of an arbitrary $1^{st}$ segment to a start point ($p_j$) of an arbitrary $2^{nd}$ segment in the xy coordinate system; and
    information on a rate ($\delta w_j$) of the segment distance ($d_j$) against the width (W) of the handwritten signature image, a rate ($\delta h_j$) of the segment distance ($d_j$) against the height (H) of the handwritten signature image, and a rate ($\delta t_j$) of the segment movement elapsed time ($\Delta_j$) against the total handwritten signature elapsed time (T) spent for the entire handwritten signature.

* * * * *